(12) United States Patent
Alpert et al.

(10) Patent No.: US 10,163,255 B2
(45) Date of Patent: Dec. 25, 2018

(54) THREE-DIMENSIONAL GEOSPATIAL VISUALIZATION

(71) Applicant: Geopogo, Inc., Berkeley, CA (US)

(72) Inventors: David Alpert, Berkeley, CA (US); Gabriele Sorrento, Bari (IT)

(73) Assignee: Geopogo, Inc., Berkeley, CA (US)

( * ) Notice: Subject to any disclaimer, the term of this patent is extended or adjusted under 35 U.S.C. 154(b) by 89 days.

(21) Appl. No.: 14/987,349

(22) Filed: Jan. 4, 2016

(65) Prior Publication Data

US 2016/0196687 A1 Jul. 7, 2016

Related U.S. Application Data

(60) Provisional application No. 62/100,840, filed on Jan. 7, 2015.

(51) Int. Cl.
*G06T 17/05* (2011.01)
*G06T 15/00* (2011.01)
*G06T 19/00* (2011.01)

(52) U.S. Cl.
CPC ............ *G06T 17/05* (2013.01); *G06T 15/00* (2013.01); *G06T 19/00* (2013.01); *G06T 2210/56* (2013.01)

(58) Field of Classification Search
None
See application file for complete search history.

(56) References Cited

U.S. PATENT DOCUMENTS

| | | | | |
|---|---|---|---|---|
| 2006/0224742 A1* | 10/2006 | Shahbazi | ............... | H04L 63/20 709/226 |
| 2009/0147003 A1* | 6/2009 | Do | ........................ | G06T 15/205 345/427 |
| 2011/0153183 A1* | 6/2011 | Cohn | ................... | G08G 1/0104 701/117 |
| 2012/0121163 A1* | 5/2012 | Zhang | ................... | H04N 5/144 382/154 |
| 2013/0282208 A1* | 10/2013 | Mendez-Rodriguez | | ..................... G01S 17/89 701/16 |

* cited by examiner

*Primary Examiner* — Said Broome
(74) *Attorney, Agent, or Firm* — Chhabra Law Firm, PC

(57) ABSTRACT

Using various embodiments, methods, and systems for implementing three-dimensional geospatial visualization techniques are disclosed. In one embodiment, a unified indoor/outdoor three-dimensional visualization of interior and exterior settings can be provided using a publically accessible geospatial website. The geospatial website can provide global positioning system coordinated point cloud data of actual exterior settings along with fantasized or actual interior settings to a client machine along with information of events occurring at the location in real time.

20 Claims, 17 Drawing Sheets

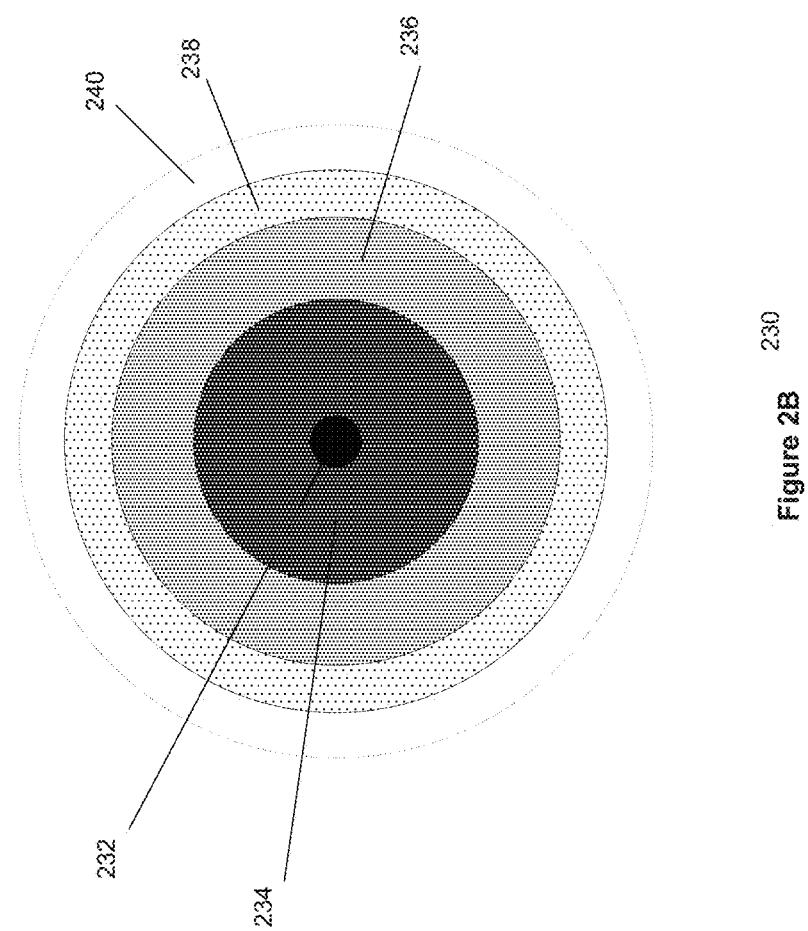

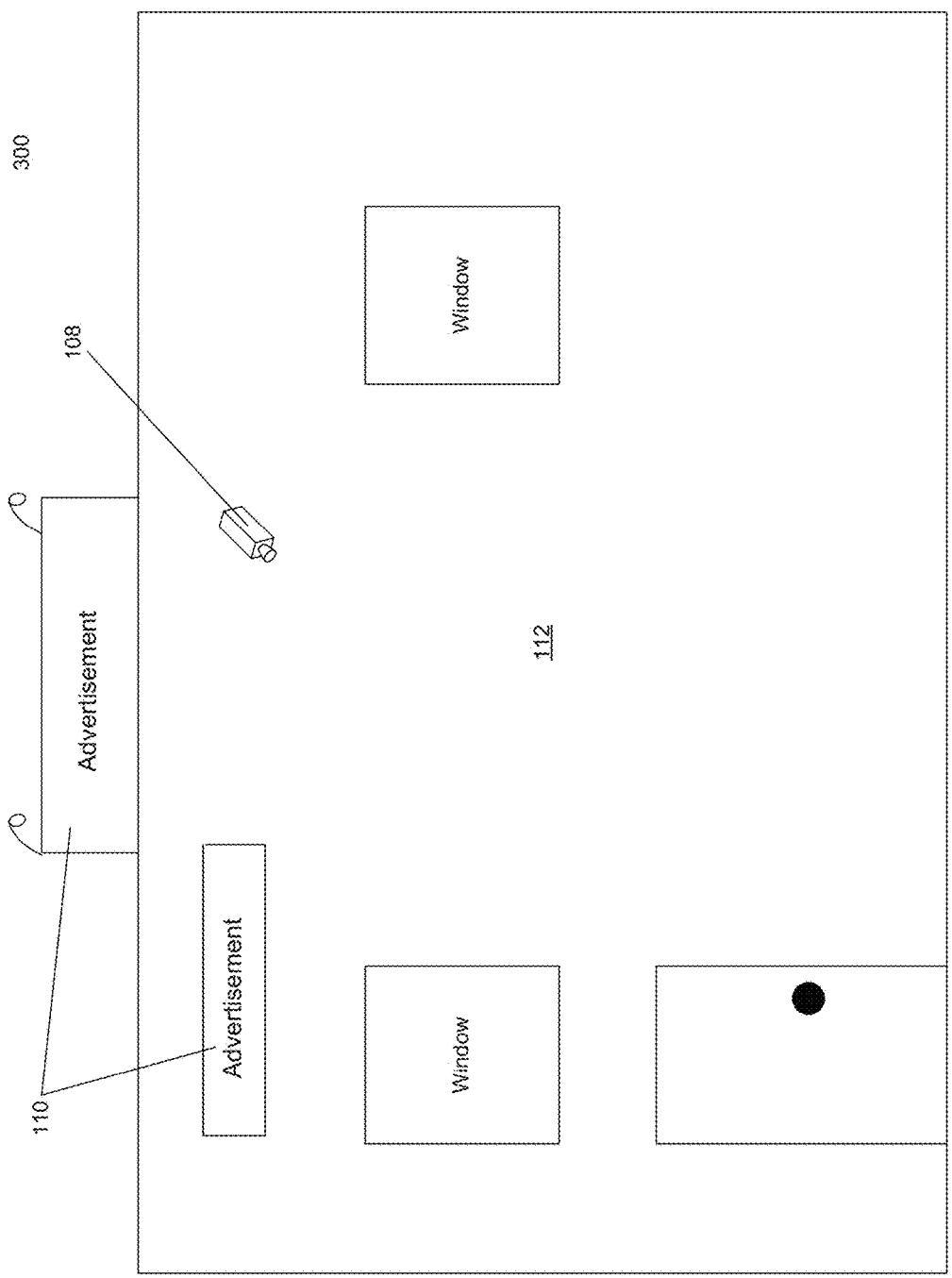

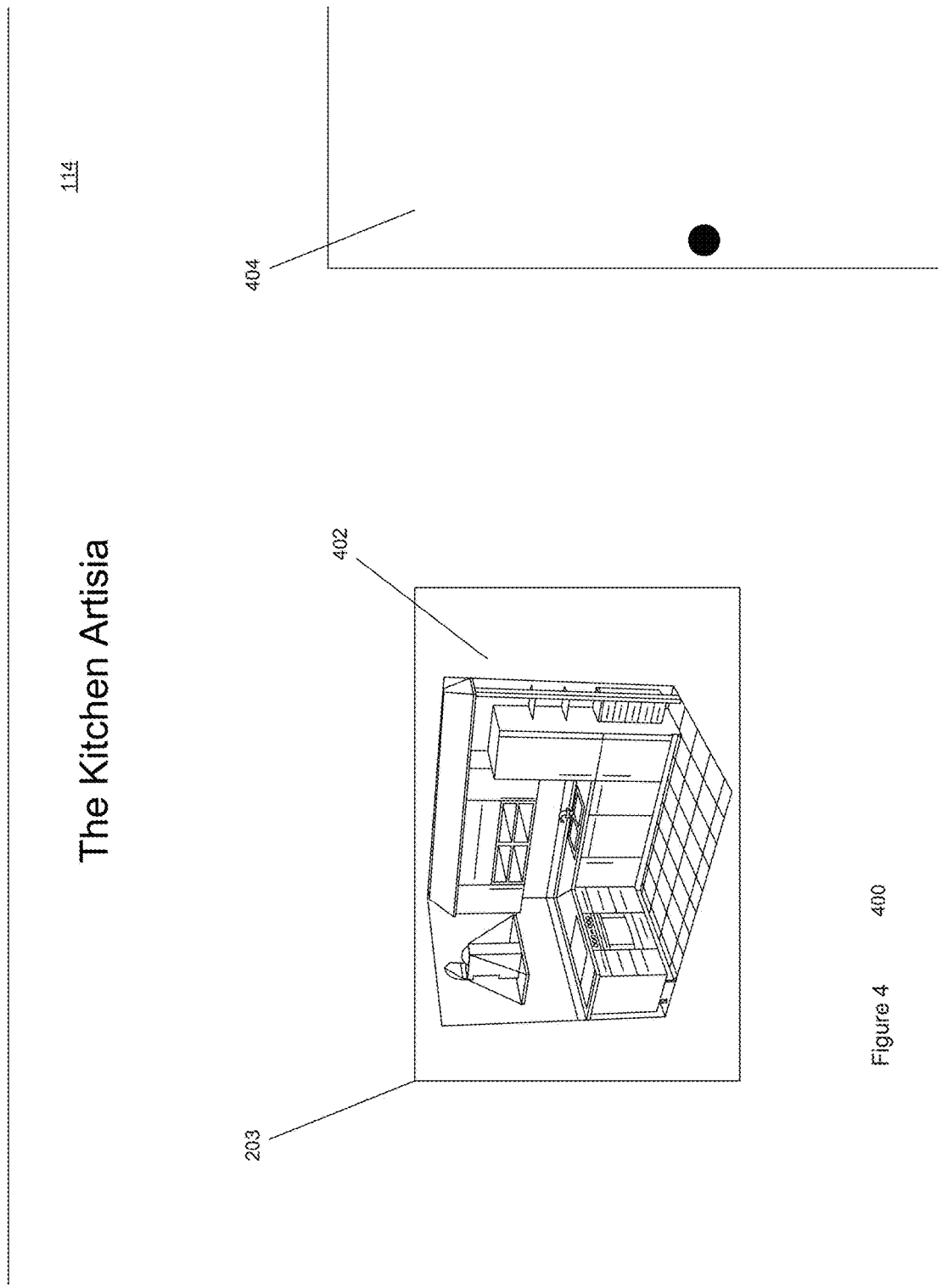

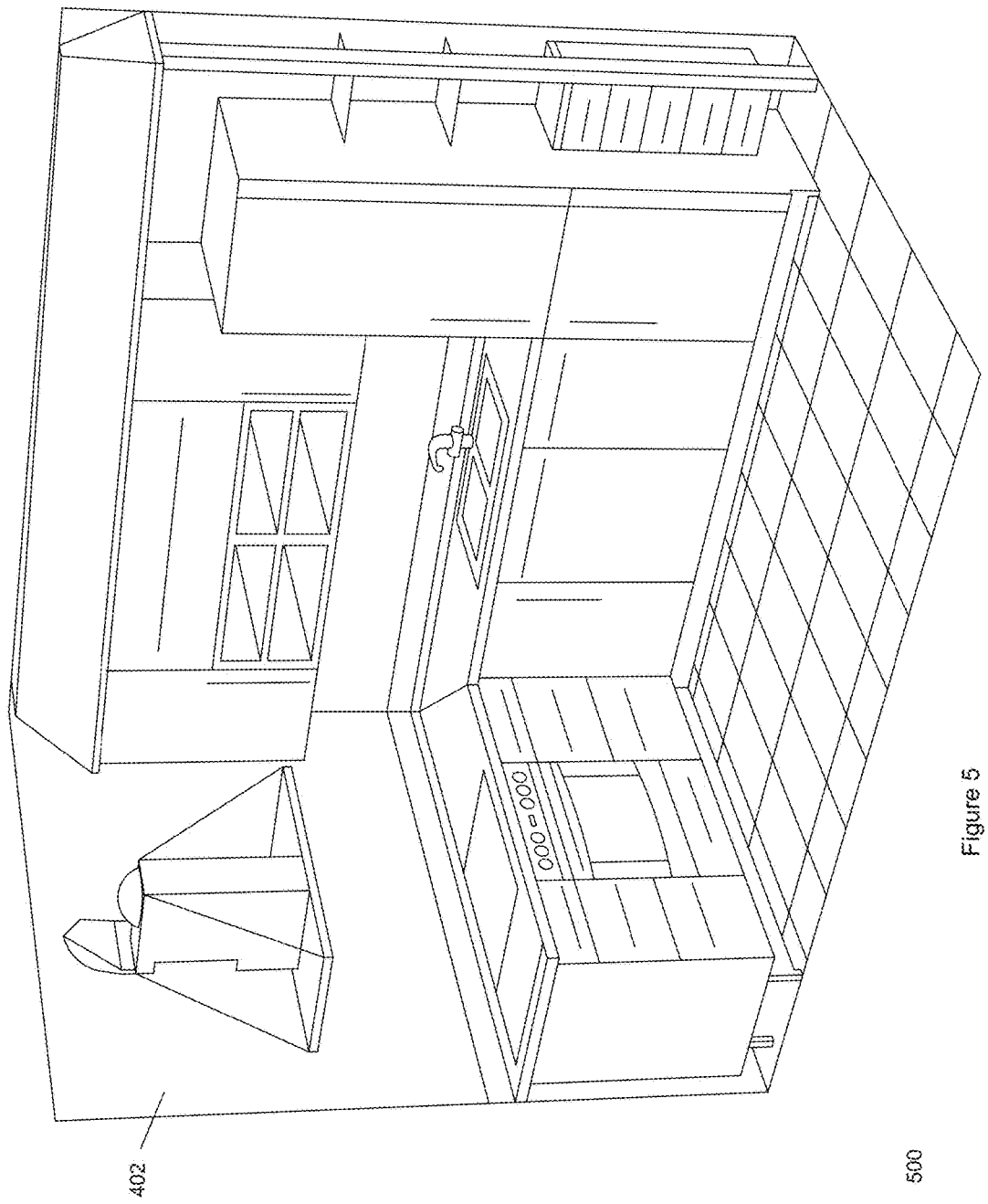

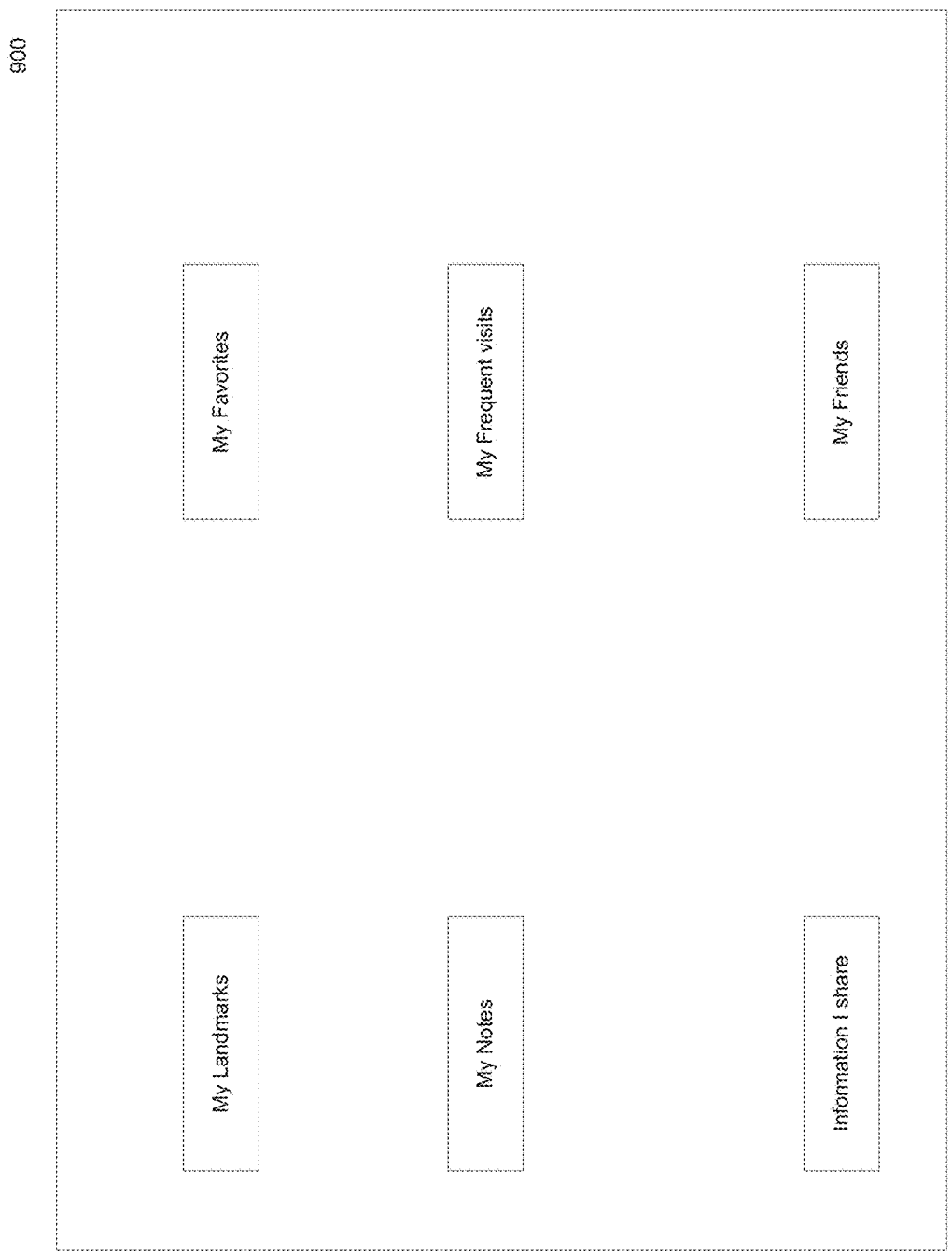

THREE-DIMENSIONAL GEOSPATIAL VISUALIZATION

CROSS REFERENCE TO RELATED APPLICATIONS

The present application claims priority from U.S. Provisional Patent Application No. 62/100,840 filed on Jan. 7, 2015, under 35 U.S.C. 119(e). The contents of the above mentioned provisional patent application is incorporated herein by reference for all purposes to the extent that such subject matter is not inconsistent herewith.

FIELD OF THE INVENTION

Embodiments of the present invention generally relate to the field of three-dimensional visualization of geospatial data. More particularly, embodiments of the invention relate to a mechanism to present a unified indoor/outdoor representation of structures, buildings, and objects using geospatial data.

BACKGROUND OF THE INVENTION

Conventional methods usually simulate three-dimensional visualization based imagery using two-dimensional technology. Such conventional methods include joining multiple individual images, e.g., panoramic bubble images, satellite images, photogrammetry, etc. However, such imagery is not unified and movement is restricted to the vantage point of the source of the two-dimensional images. This limits the viewer's freedom to move through and explore a given setting.

Furthermore, conventional methods are usually automobile oriented with a bias towards vehicular way-finding rather than pedestrian experience. Thus, what is needed are techniques that provide a unified indoor/outdoor three-dimensional visualization of exterior and interior settings. Such techniques should be capable of providing experience of free movement that is not limited by the vantage point of the source of a two-dimensional image. Furthermore, such techniques should be capable of providing (and catering to) multiple user experiences, including bicyclists, pedestrians, etc.

SUMMARY OF THE DESCRIPTION

Using various embodiments, system is described that can display a three-dimensional rendering of geospatial data in a client-server configuration. Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

The innovative subject matter of the present invention provides mechanisms and techniques to display, virtually experience, and interact with 3D geospatial models comprising geospatial objects and non-geospatial objects, including the interior and exterior settings, streets, roads, alleys, buildings, structures, other objects, etc.

In one embodiment, the client machine can request global positioning system (GPS) coordinated three-dimensional (3D) point cloud data related to a geographical location. As discussed further herein, a 3D coordinated point cloud data is a set of data points in a three-dimensional coordinate system that is intended to represent the external surfaces of a geospatial or non-geospatial object. Geospatial data represents information about a physical object (e.g., street, building, road, structure, etc.) that can be represented by numerical values in a geographic coordinate system. The point cloud data provides a realistic representation of the geographical location. In one embodiment, after requesting the point cloud data, the client machine, receives the point cloud data from the server. In one embodiment, the server transmits the point cloud data after receiving information related to GPS coordinates of the geographical location.

The client machine, in one embodiment, renders the point cloud data to depict a 3D view of the geographical location. In another embodiment, during the rendering process, the client machine determines the presence of heat-maps or secret passages (portals) in the point cloud data. This information is provided by the server during transmission of the point cloud data. In an embodiment, the client machine can further be configured to receive information about real-time events related to the geographical location. The real-time information can be transmitted from a database associated with the server, and the client machine can display the real-time events on the rendered point cloud data.

In one embodiment, the point cloud data further includes exterior and interior settings. As discussed further herein, an interior or exterior setting is the manner, position, or direction in which a geospatial object or a non-geospatial object is set and displayed. In this embodiment, the interior settings can be locked and unlocked by means of an electronic code to prevent access and view by unauthorized persona, but allow access by an authorized persona, the persona being a virtual self of a user/person using the system. In yet another embodiment, the interior settings display items that are displayed at the geographical location.

In one embodiment, the point cloud data is requested responsive to determining the GPS coordinates of the geographical location where the persona is positioned within the point cloud data. In one embodiment, the client machine is configured to periodically determine the position of the persona in the point cloud data, and prior to requesting the point cloud data from the server, the client machine determines that the point cloud data is not available locally in its cache. In such an embodiment, if the data requested by the client is not present at the server, then the server can attempt search and retrieve the requested data from other sources. In one embodiment users can provide their own internal and external settings related to a geographical location.

Further, in one embodiment, the movement of the persona in the point cloud data can be set to various speeds representing at least one of a pedestrian speed, bicycle speed, automobile speed, airplane speed, or air-balloon speed. In one embodiment, real-time events are displayed to the user using video cameras (e.g., IP cameras, web cameras, etc.) present at the geographical location. Additionally, in one embodiment, mobile vehicles can be present that can be used to access certain features (e.g., access to website portals of merchants or vendors who do not have a brick and mortar location, providing a similar experience to street vendors in the real world). In another embodiment, exterior settings can be rendered "transparent", revealing interior spaces within. In one embodiment, interior settings can include options to pass freely to other non-adjacent setting by means of designated secret passages/portals.

In yet another embodiment, the geospatial 3D models can be customized to the preferences of different users of the system, thus accommodating the needs of pedestrians, bicyclists, automobile users, etc., and presenting such users a virtual world of the realistic representation of a physical location.

BRIEF DESCRIPTION OF THE DRAWINGS

The present invention is illustrated by way of example and not limitation in the figures of the accompanying drawings in which like references indicate similar elements.

FIG. 2B illustrates a data-fetching process for the three-dimensional geo-spatial model, according to one embodiment of the present invention.

FIG. 3A depicts a view from the prospective of the persona of a user according to one embodiment of the present invention.

FIG. 4 illustrates another view from the perspective of the persona of a user, according to one embodiment of the present invention.

FIG. 5 illustrates another view which provides a detailed setting, according to an embodiment of the present invention.

FIG. 9C illustrates a user interface that can display layers of information, according to an embodiment of the invention.

DETAILED DESCRIPTION

Figure 1A:
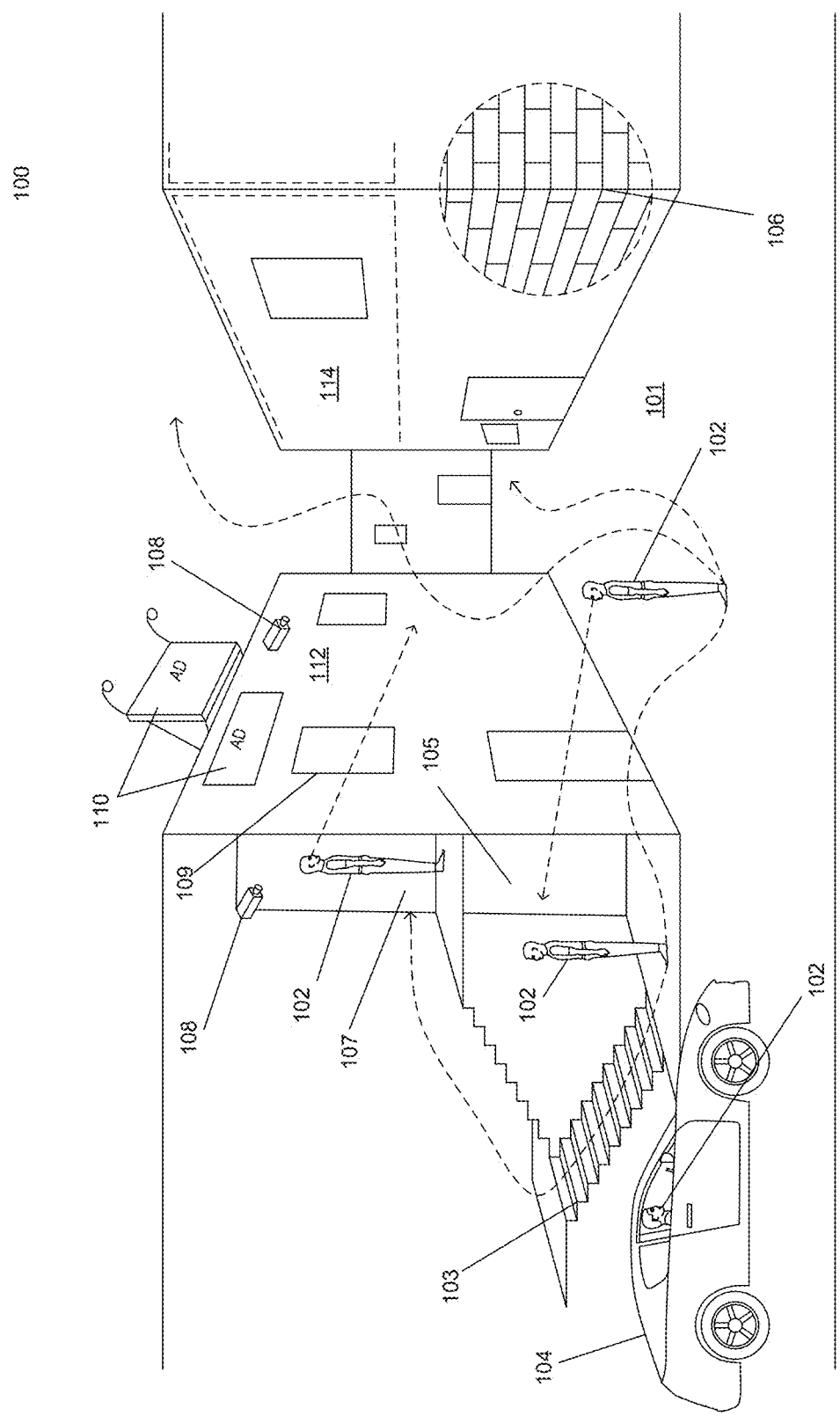
FIG. 1A illustrates a diagram describing the actions that can be generally performed by a user according to an embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

A persona is a virtual self of a user/person, according to any embodiment of the invention, as disclosed herein. Geospatial data (also referred as a three-dimensional model herein), as known to a person of ordinary skill in the art, represents information about a physical object (e.g., street, building, road, structure, etc.) that can be represented by numerical values in a geographic coordinate system. An interior or exterior setting is the manner, position, or direction in which a geospatial object (e.g., exterior surroundings like building, structure, street, etc.) or a non-geospatial object (e.g., interior surroundings like objects within a building or structure, vehicles, street signs, street lighting, etc.), is set and displayed, according to any embodiment of the invention, as disclosed herein.

A three-dimensional (3D) coordinated point cloud is a set of data points in a three-dimensional (X, Y, and Z) coordinate system that is intended to represent the external surface of a geospatial or non geospatial object. Digital representations of point clouds can be created using 3D object scanners and stored in one or more data files. A point cloud represents the set of points that can be processed to render a virtual representation of the scanned geospatial or non-geospatial object, according to any embodiment of the invention, as disclosed herein.

The present invention provides mechanisms, techniques, systems and/or methods to display, virtually experience, and interact with 3D geospatial models comprising geospatial objects and non-geospatial objects, including the interior and exterior settings, streets, roads, alleys, buildings, structures, other objects, etc. In one embodiment, a system is implemented using the techniques described herein where the geospatial 3D models are displayed to a user using a website where a user can login (e.g., client-server model). In one embodiment, the geospatial models are generated using a GPS-coordinated three-dimensional (3D) point cloud in which a user's persona can move freely within the 3D point cloud, giving the user the experience of virtually moving in the geospatial 3D model. The exterior settings, in an embodiment, provides a realistic representation of the physical location presented by the GPS coordinates, the interior settings can be presented in a variety of 3D representations, including both realistic settings or fantasized settings, or a combination thereof. In another embodiment, interior settings can be locked and unlocked by means of an electronic code to prevent access and view by unauthorized persona, but allow access by an authorized persona. In another embodiment, interior settings are unlocked to unauthorized personas/users during specific hours (e.g., business hours), but can be accessed by authorized persona(s)/users at all times. Once a persona is within the interior settings represented by the 3D point cloud, the user can realistically view adjacent exterior settings from within the interior settings of the structure (e.g., from a window of the interior settings).

In one embodiment, the settings include points/locations where the physical structure of a setting can be clicked to explore that part of the setting in greater detail. In one embodiment, the 3D geospatial model can be customized by users to add their own 3D settings. In another embodiment, the geospatial 3D model represents a virtual world that includes website-specific, native advertising, including signs, banners, and billboards, all of which are capable of being customized to the interests of each user. In another embodiment, video cameras (e.g., webcams) can be strategically placed at designated spots that can be viewed by an individual or multiple users of the system, providing opportunities to meet other users and exchange messages. In another embodiment, the video cameras can be placed in a setting representing a camera placed at real physical location, and when clicked, the camera can provide an augmented reality to the user by displaying real-time (live) streaming of the physical location where the video camera is present.

As mentioned above, in one embodiment, mobile vehicles can be present that can be used to access certain features (e.g., access to website portals of merchants or vendors who do not have a brick and mortar location, providing a similar experience to street vendors in the real world). In another embodiment, exterior settings can be rendered "transparent", revealing interior spaces within. In one embodiment, interior settings can include options to pass freely to other non-adjacent setting by means of designated secret passages. Views from interior settings to exterior settings can be linked to actual, GPS-coordinated exterior settings, providing realistic rendition of actual views. Views can be summarized and rated. Interior settings can be used to display more items than can be displayed in the real world. For example, a museum can display items from its collection that are not on actual display, and tailor displays to individual tastes.

In one embodiment, property owners and tenants can dock 3D models to GPS-coordinated exterior world. Users, with or without their personas, can purchase goods and services from both exterior and interior settings, via the website. Identical interior models can be docked at multiple locations, for example by a merchant with multiple stores in different locations.

In one embodiment, a user creates profile to represent their persona and logs in to a system implemented using the techniques described herein, to access a geospatial 3D model of a virtual world. In another embodiment, movement in virtual world can be set to various speeds, such as pedestrian speed, bicycle speed, automobile speed, airplane speed, or balloon speed. In another embodiment, the system can be used as a route planner providing directions between start and end locations. In another embodiment, access into interior spaces may be free of restrictions or may be limited by fee, hours, or restricted to specific users. In one embodiment, a user can use the geospatial virtual world to simulate actual views from a variety of settings, such as homes, apartments, restaurant tables, hotel rooms, and theater seats, serving as a resource before making reservations or purchases. Users can gain access to performance events in virtual world, linked to performance events in real world. In one embodiment, a "designer whiteboard" can be implemented that can enable a user to modify parts of the virtual world by "erasing" image and sketching and coloring over area. In another embodiment, "footprints" can be implemented to enable a user to record and to highlight pathways and points to create individually-tailored maps. In other embodiments, "mapalytics" (map analytics) can be implemented to enable a user's access to heat-maps (e.g., pedestrian score, automobile score, bicyclist score, etc.,) that depict intensity and quality of specific features, such as restaurants, pedestrian access, topographic gradients, shopping, green-space, public transit, etc. In relation to trip-planning and way-finding, users, in one embodiment, can obtain trip duration estimates based upon walking, bicycling, and public transit, in addition to driving.

Thus, using various embodiments, the mechanisms described herein provide a near-realistic experience of a three-dimensional virtual world that is based on a realistic exterior representation of a given (actual) physical geographical location. In one embodiment, a user/persona accessing any system implemented with the techniques described herein is capable of navigating freely through the accessible exterior and interior settings. In another embodiment, the user/persona accessing such a system is given an opportunity to freely explore in all directions in a realistically rendered 3D exterior representation of the world and see between exterior settings and designated interior settings using their persona. In yet another embodiment, the user/persona accessing such a system is provided an opportunity to buy/sell merchandise in 3D settings in and adjacent to realistically rendered 3D exterior representation of world. Further, in one embodiment, the user is presented an opportunity to overlay individually-tailored information on the geospatial model. In yet another embodiment, the geospatial 3D models are tailored to accommodate the needs of pedestrians and bicyclists, as well as automobile users (instead of the conventional maps that are created for the needs and requirements of automobile users), presenting such users a virtual world of the realistic representation of a physical location.

FIG. 1A illustrates diagram 100 describing the actions that can be generally performed by a user/persona according to an embodiment of the invention. Diagram 100 generally describes some different directions in which persona 102 can walk or explore, which is represented by the dotted arrowed line, according to an embodiment of a system implemented using the techniques described herein. Diagram 100 shows realistic exterior settings detailing buildings/structures 112 and 114 on street 101, along with interior settings staircase 103, first floor 105, and second floor 107 of structure 112. In one embodiment, the exterior settings can be a realistic representation of a physical location. Persona 102 can view the three-dimensional realistic depiction of street 101 including buildings (or structures) 112 and 114. In one embodiment, the 3D realistic depiction is provided as point cloud data transmitted from a server and rendered on a client machine. Diagram 100 illustrates some of the various movements/actions that can be performed by user using persona 102. For example, a user can, via persona 102, view the street 101 while driving vehicle 104. Persona 102 can also view exterior settings of structure 112 or view interior settings 103, 105, and/or 107. Persona 102 can also walk inside structure 112, including virtually walking up stairs 103. Persona 102, in another embodiment can also view the street 101 from a window of structure 112 (e.g., from second floor 107, via window 109). Thus, persona 102 is free to move within and around the structures 112 and 114 and street 101, giving the user an experience of moving freely as they would have done in the real world. In one embodiment the user can also zoom in and see a detailed view of any geospatial or non-geospatial object as referred by 106. In this embodiment, the user can click on the exterior setting of structure 114 to view a detailed representation (e.g., bricks of the building) as represented by 106.

In one embodiment, diagram 100 can depict a realistic and/or a fantasized rendition of any setting, whether interior or exterior. In one embodiment, the user can click on webcam 108 to interact with other users (e.g., video, voice, or text chat). In another embodiment, clicking on webcam 108 displays a real live stream of street 101 from the prospective view of webcam 108. In such an embodiment, however, a real webcam or video camera must be placed on a real exterior setting where webcam 108 is depicted to be present. In one embodiment, building 112 and building 114 can be real bricks and mortar businesses that have actual presence at the location depicted by the point cloud. The point cloud data can represent real exterior settings of brick and mortar businesses, providing a virtual presence to the businesses. The point cloud data can also comprise real exterior and/or interior settings of any physical location. Such point cloud data can be generated using 3D scanners (e.g., laser 3D scanners) that can be transported to actual physical locations using a variety of transportation mechanisms (e.g., hand held 3D scanner. 3D scanners mounted on land or aerial systems, buildings, etc.). In one embodiment, mobile trucks/vehicles/objects (not shown in FIG. 1) can provide options for businesses without bricks and mortar locations to show their presence in a realistic setting, whose websites can be accessed by the user by clicking on the mobile trucks/vehicles/objects.

In one embodiment, the owner of a realistic exterior setting can choose to have a realistic or fantasized rendition of the interior settings of their realistic structures rendered in the virtual world. In another embodiment, advertisement displays 110 can be shown which could be realistic placement of advertisements at a business, residential building, other geospatial object, or a fantasized placement thereof. In another embodiment, the user/persona may also be provided x-ray vision using which the user may be able to see through the exterior settings of a structure, directly into the interior space settings.

Figure 1B:
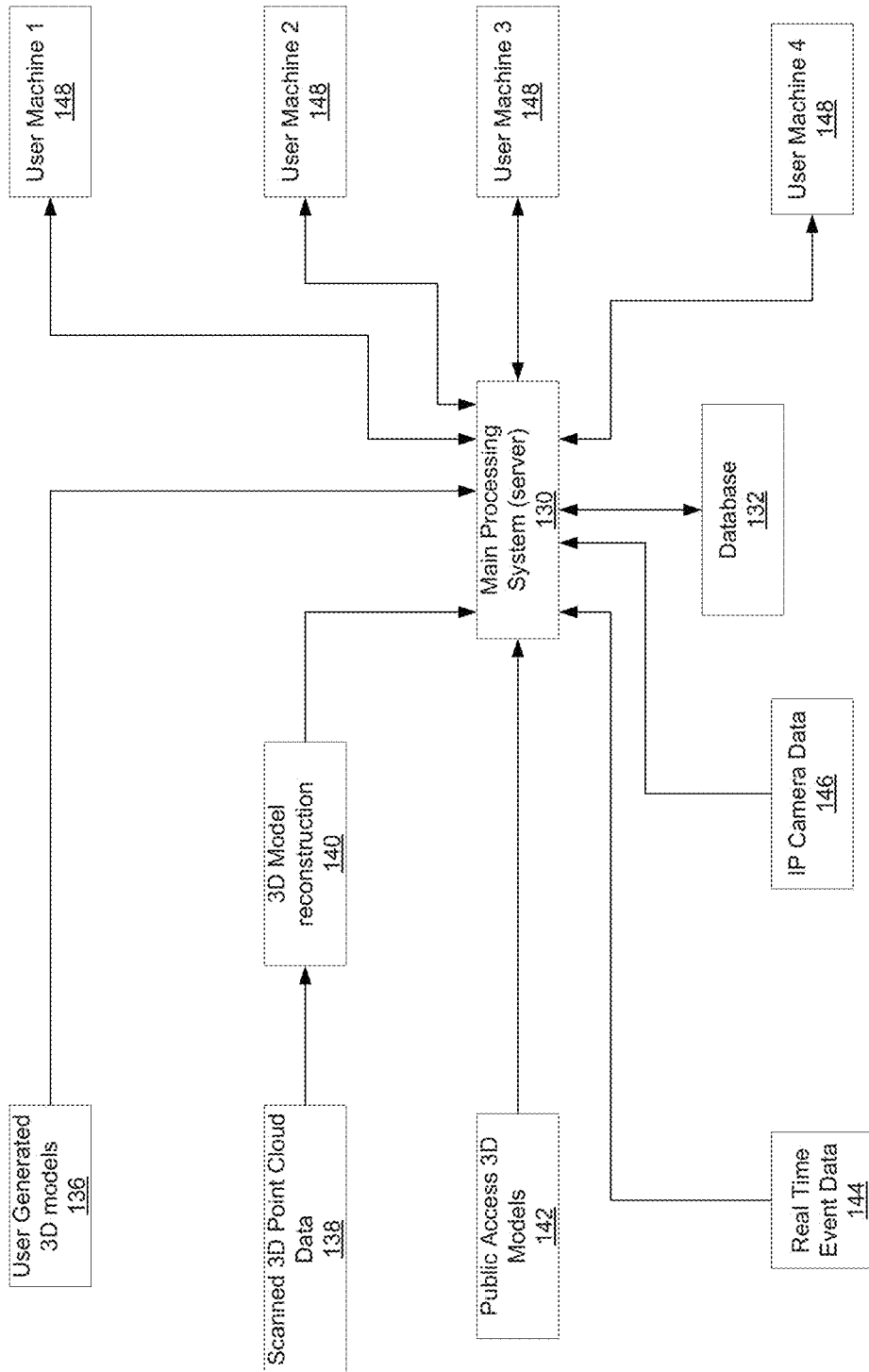
FIG. 1B illustrates block diagram describing the sources of data that can be used by a system rendering three-dimensional (3D) geospatial data to a user over a network.

FIG. 1B illustrates block diagram 125 describing the sources of data that can be used by a system rendering three-dimensional (3D) geospatial data to a user/persona over a network. As shown, a main processing unit 130 can be a server machine to provide the 3D geospatial data to a client machine 148. In one embodiment, a user generated 3D model 136 can be provided to server 130 for processing and displaying a 3D geospatial data on client machine 148. User generated 3D model 136 can be geometrical data such as meshes, shades, and/or textures. Geometrical data can also include any other data known to a person of ordinary skill in the art. In one embodiment, user generated 3D model files can be generated using any Computer Aided Design (CAD) software such as Autodesk AutoCad, Trimble Sketchup, McNeel Rhinoceros, etc. In a preferred embodiment, Keyhole Markup Language (KML) protocol based data (saved in, for example, compressed KML (KMZ) files) comprising COLLADA mesh(s) can be used due to its ability achieve high data compression, as required for over the internet application systems.

In one embodiment, once the user uploads 3D model 136, server 130 assigns it a unique identifier based on the geographical location of the model. The user can be prompted to provide latitude, longitude, altitude, and north vector information about the uploaded 3D model 136. The north vector can represent the direction of orientation of the model. In one embodiment, the north vector is a unit vector with a magnitude of one. In another embodiment, Server 130 can also process and display Scanned 3D point cloud data 138. This data is a set of 3D points created by a 3D scanner device and provides a virtual representation of an object, location, and/or area. In one embodiment, before saving point cloud data 138 to database 132, server 130 can process point cloud data 138 to generate a 3D model reconstruction 140 of point cloud data 138. 3D model reconstruction 140 can include converting the point cloud data into a textured mesh model. In one embodiment, such processing is preferred since it provides a uniform representation of point cloud data 138 across the system.

In yet another embodiment, Server 130 can also access 3D models from a publicly available database 142. As discussed further herein, data requested, but not available within the cache of client machine 148, can be searched in server database 132, and if not available, a publicly available data source 142 can be searched to retrieve the data requested by client machine 148. Server 130 can also provide client machine 148 real-time event data 144. In one embodiment, real time event data can include a 3D model representing an event occurring in the physical location of a geo-spatial data requested by the user. For example, if a persona is visiting a physical location (e.g., a stadium) where an event (e.g., concert) is occurring, in one embodiment, the user would be able to see details about the event or related information (e.g., advertisements, banners, sales, coupons, etc.) pertaining to the event within the geospatial data. In certain embodiment, server 130 can also process and stream data from IP based cameras 146. IP cameras 160 can augment a user's virtual experience by displaying streaming data of a physical location. Thus, in a concert setting, in one embodiment, the user/persona can access the concert in real time from a stadium. Similarly, in a setting that involves fairs or a congregation of people, the user can access streaming data from IP cameras present at or near the physical location.

In one embodiment, Camera 146 is placed by server 130 in a geospatial setting according to the locations registered in database 132. When the user clicks on a camera icon within a setting, server 130 checks for the availability of streaming data, and transmits the data to client machine 148 where it is rendered.

Server database can comprise user data that can, in one embodiment, include a unique identifier, username, password, sign in date, last login date, visited locations, history, preferred locations, etc. using which the user's preferences and 3D geospatial model settings can be loaded upon user login. Server database can also, in one embodiment, include 3D geospatial model settings including a unique model identifier, file name, file type, model latitude, model longitude, model altitude, model north vector, heading angle, tilt angle, roll angle, scale, unit, data source, author, date added, last edit date, etc. Server database can also include real time event data comprising start date, end date, activities, participants, web platform link, etc. Further, server database can also include IP camera data that comprises, RSTP URL, camera latitude, camera longitude, camera altitude, username, password, video width, video height, resolution, bitrate, compression format, etc.

Figure 2A:
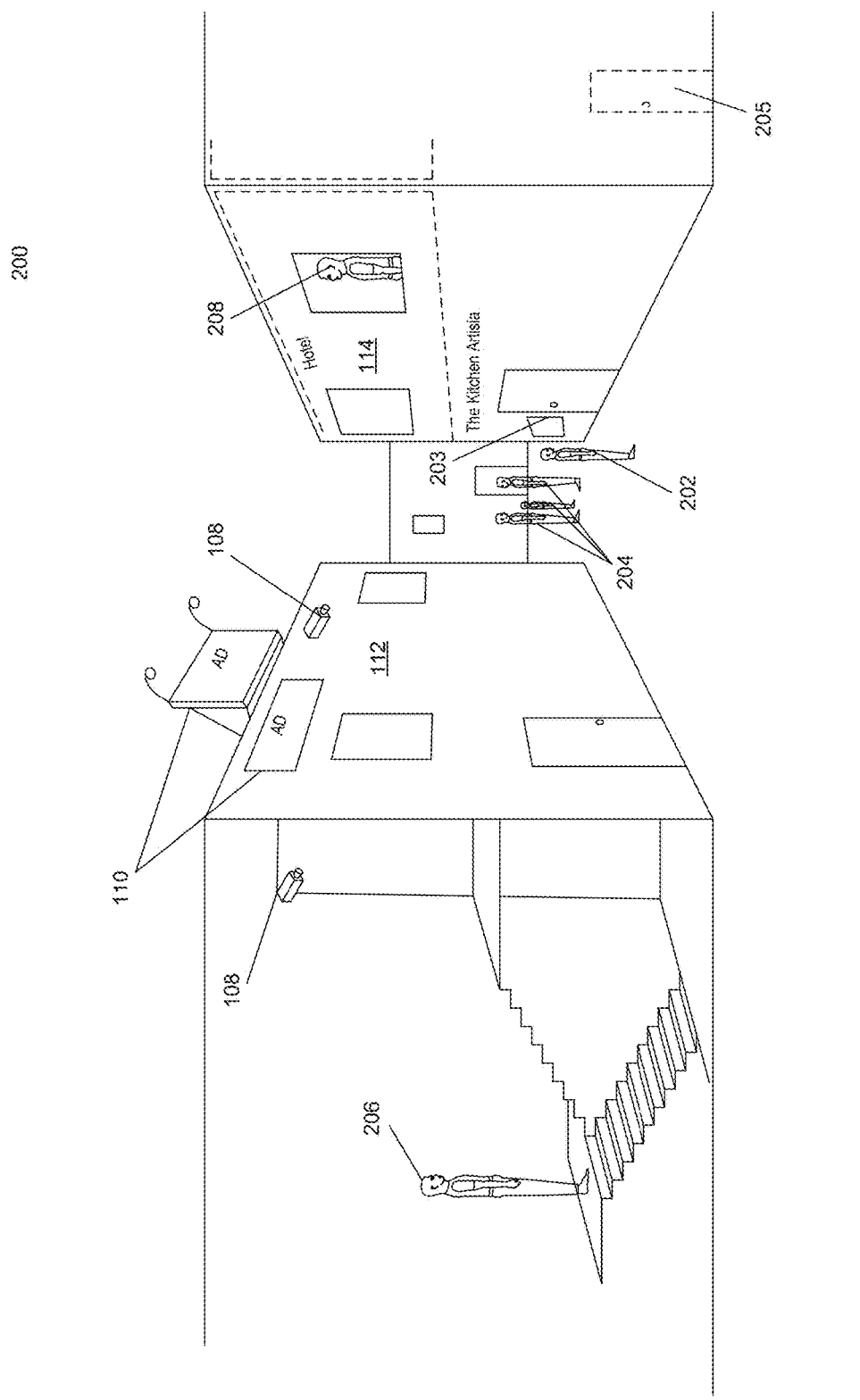
FIG. 2A illustrates an embodiment of the invention displaying multiple users and their interactions with the system disclosed herein.

FIG. 2A describes an embodiment of the invention in which multiple personas can be present on street 101 or within buildings 112 and 114 as can occur in a realistic rendition of an actual street 101. In this embodiment persona 202 may be viewing through window 203 of structure 114. Personas represented by 204 may be able to interact with each other by simply coming within each others vicinity or personal space. In one embodiment, a user may interact with another user by approaching the other user's persona and clicking on it and typing a message. In this embodiment, the other user may be given an option to respond back (by text, video or voice chat) or to ignore the user initiating the conversation. Personas 204 may be able to communicate with each other via video/voice/text chat. Similarly, persona 206 may be viewing the interior settings of structure 112. In one embodiment, the user can view the interior or exterior settings from any altitude (height) as long as the point data from that altitude is available. Thus, in such an embodiment, the persona may be able to "fly" within the point cloud data, thereby displaying features and/or structures to the user that may be available from a certain altitude only (e.g., the detailed architectural design of a dome on the top of a 20 floor high building, etc.). Similarly persona 208 can be viewing structure 112 from window of a hotel present in structure 114. In this manner multiple users may be able to have their own experience of a real street and/or buildings while being able to communicate with each other as could have been done in reality by visiting the actual street, building, structure, or hotel.

In one embodiment, secret doors/passages/portals 205 can be provided that are visible to all or only certain users. It should be noted, secret doors, passages, or portals have been interchangeably used herein. In another embodiment, each user can customize the placements of their secret door 205 that is visible only to the user who created it. In yet another embodiment, each user can decide whether they want to share the location with other users (e.g., with the public, or with a select group of friends). Thus, secret door 205 may be placed by (and visible to) user of persona 202 only, or user of persona 202 may decide to share the location of secret door 205. Secret door 205, in one embodiment, can act as a gateway to another location as configured by the user. The user of persona 202 can configure secret door 205 to take the user (once the door is opened) to another location (e.g., another building, the user's home, or any other preferred location). In another embodiment, secret doors or passages can be implemented using any geospatial or non-geospatial element. In this embodiment, the user can place secret passages or portals in any location (e.g., a signpost), and optionally share the secret passage location with other users.

FIG. 2B illustrates diagram 230 illustrating a data fetching process for the three-dimensional geo-spatial model, according to one embodiment of the present invention. In order to make data transfer over a network efficient, a server machine can employ efficient data transmittal techniques while transferring data to the client machines. As show in diagram 230, the persona's position in a geospatial setting is illustrated by 232. In one embodiment, the server can transmit high resolution geospatial data represented by area 234, low resolution geospatial data represented by area 236 and very low resolution geospatial data represented by area 238. Any data further than area 238 (represented by 240) is not shown or shown with an extremely low resolution. Thus, by employing such techniques data can be optimized and system performance can be increased. Further, such techniques are useful because objects further away from the persona do not need to be rendered in greater detail than objects nearby to the persona. Once the persona moves within the geospatial data, such techniques can be reemployed for the new coordinates of the virtual location visited by the user/persona.

In one embodiment, [MJ] set of 3D objects (or model) can be rendered at different level of details, where J signifies the level of detail (LOD tag), with a higher value of J signifying a lower level of detail, and defined for the $J^{th}$ level of detail of the model, M. In such an embodiment, the virtual distance (radius) $d_J$ for the $i^{th}$ model from the persona can then be calculated as:

$$d_J = \sqrt{(X_t - Xm_i)^2 - (Y_t - Ym_i)^2}$$

where the virtual position of a persona at a given latitude and longitude at time (t) can be represented as (Xt) and (Yt) respectively. Xmi and Ymi represent the virtual latitude and longitude of the $i^{th}$ georeferenced 3D model. In one embodiment, the actual level of detail at which each i-th 3D object enclosed in the model is assigned by comparing the value $d_J$ with a set of thresholds K defined by the system administrator:

Threshold domain LOD tag
$0 < d_J$ and $d_J < K_1$ LOD 1 (Very High)
$K_1 < d_J$ and $d_J < K_2$ LOD 2 (High)
$K_2 < d_J$ and $d_J < K_3$ LOD3 (Low)
$K_3 < d_J$ LOD4 (model not rendered)

FIG. 3A depicts view 300 from the prospective of persona 208 according to one embodiment of the present invention. In this embodiment, the user of persona 208 can view the exterior settings of structure 112 as viewed from a hotel room within structure 114. View 300 depicts advertisements 110 and webcam 108, as seen by user of persona 208. In this embodiment, user of persona 208 can click on webcam 108 to see a real live street view of street 101. User of persona 208 can also click on advertisements 110 and see a detailed advertisement or be directed to the web-portal/website of the advertising business. In one embodiment, by clicking on advertisement 110 user of persona 208 can be forwarded to the website of the advertisement provider.

Figure 3B:
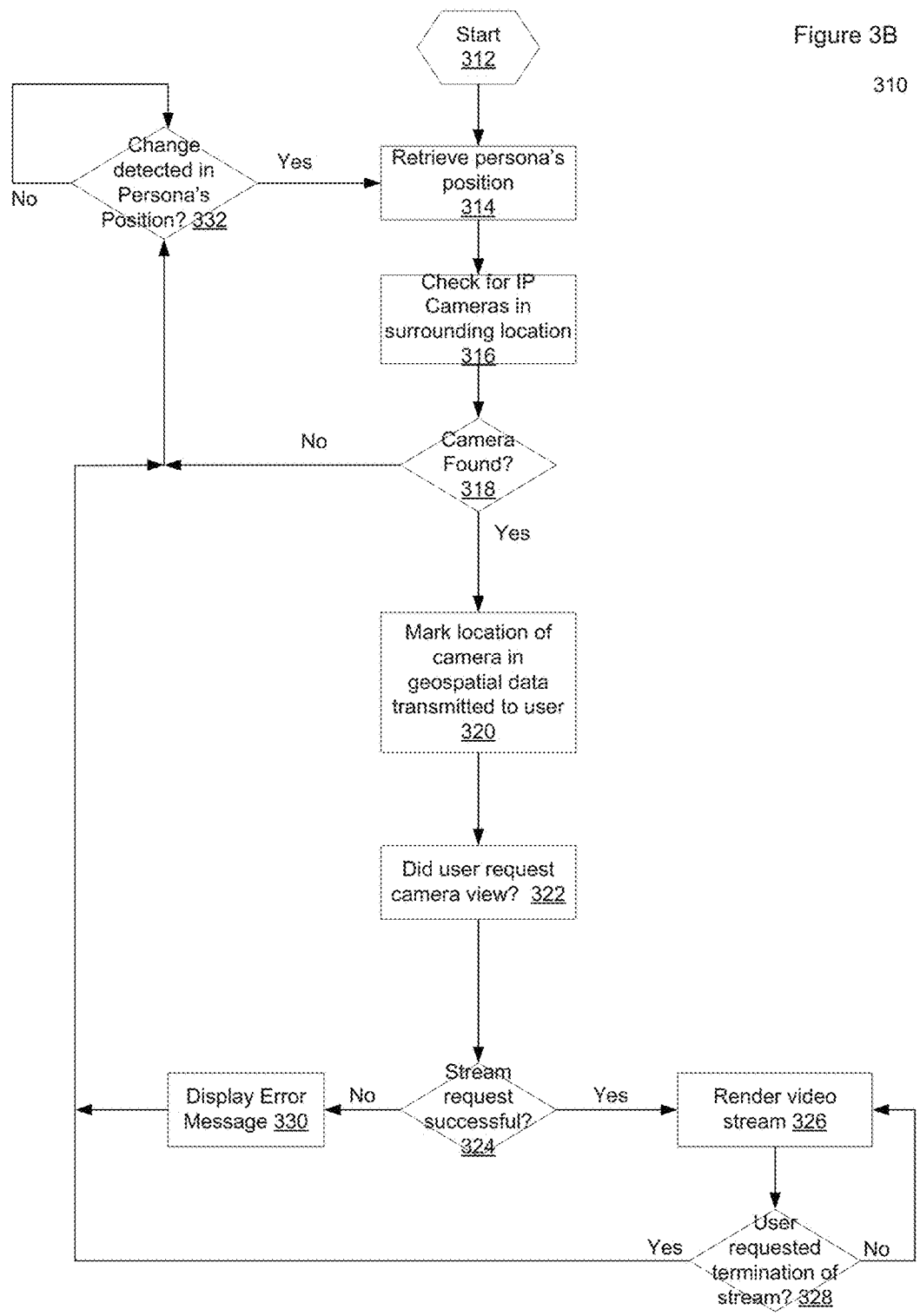
FIG. 3B depicts a flowchart illustrating the process using which data can be streamed using cameras according to one embodiment of the present invention.

FIG. 3B depicts a flowchart illustrating the process 310 using which data can be streamed using cameras according to one embodiment of the present invention. As shown, at 312 the process begins. At 314, the server retrieves the persona's current position in the geospatial data setting. At 316 the system checks for cameras in the surrounding location relative to the persona's coordinates. In one embodiment, the location (e.g., coordinates) of the cameras are provided known to the server independently of the geospatial data. Thus, in such an embodiment, the server can map the coordinates of known cameras to the coordinates of the persona in the geospatial setting. At 318 the server determines if any camera is found near to the persona's coordinates, and if so, as represented by 320, camera information is transmitted to the user along with the geospatial data. At 322 the user/persona requests to view a stream of a camera. At 324 the server determines if the stream retrieval request was successful. If so, the video stream is redirected to the client machine where it is rendered and displayed to the user, as shown at 326. If however, the stream is not available, at 330 an error message is displayed to the user and control passes to 332 where it is determined if the persona's position has changed in the geospatial setting. If the stream is transmitted to the user, transmission continues until the user requests termination of the video, as shown at 328 from where control is transferred to 332. At 332, if a change in the persona's position is detected, control is forwarded to 314 where the process is repeated, as discussed above.

FIG. 4 illustrates view 400 from the perspective of the persona of user 202, according to one embodiment of the present invention. In one embodiment, persona 202 can view window 203 of structure 114 from street 101 and see model settings 402 which, as an example, is a model kitchen provided by the fictitious store "the kitchen artisia," which specializes in providing custom built kitchen designs. As can be seen from FIG. 2 the user of persona 202 is viewing the settings of the kitchen model 402 via window 203 of structure 114. In this example, the user can see interior settings of the kitchen artisia store from the exterior setting of structure 114.

FIG. 5 illustrates view 500 which provides a detailed view of model settings 402. In one embodiment, the user can view the detailed view of model settings 402 by either clicking on window 203, or by visiting the interior of structure 114 using door 404. Thus, presuming fictitious store kitchen artisia actually existed, in this embodiment, the user of persona 202, could virtually visit the store and appreciate the detailed settings of the remodeled kitchen from within the comfort and confines of their home or office without actually visiting the store.

Figure 6:
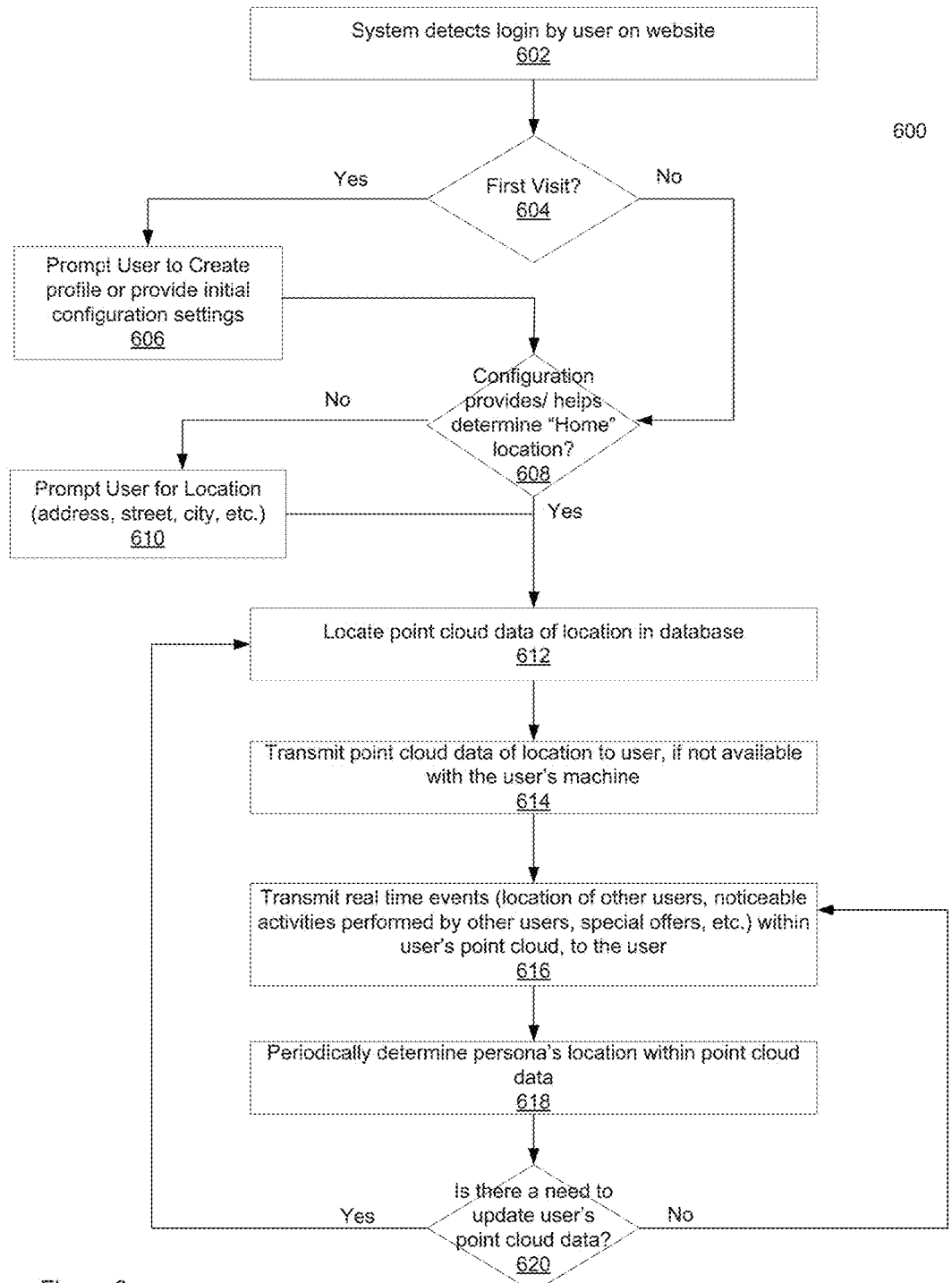
FIG. 6 illustrates a flowchart implemented by a server according to an embodiment of the present invention.

FIG. 6 illustrates a flowchart 600 implemented by a server according to an embodiment of the present invention. As can be seen at 602, the system detects login by the user on a website. At 604 the system determines if it was the first visit by the user, and if so, control passes to 606 where the user is prompted to create a profile or provide initial configuration information that can be used to create or define the user's persona. Thereafter, at 608, if it is determined that the user has provided a default home or preferred initial location, control passes to 612 where a 3D point cloud data is located from within a database in communication with the server. However, if, at 604 it is determined that it is not the user's first visit, then control directly passes to 608, as it is presumed the user's profile had already been created during their first visit. In such a case at 608 it is determined whether the user's configuration provided a default home or preferred location. In one embodiment, the home location could be any preferred location provided by the user. The user can configure the system to set this location as the user's default location each time they login. In another embodiment, the home location may be determined from the last place visited by the user. However, if the configuration setting does not provide a home location (or a home/preferred location cannot be determined), then control transfers to 610 where the user is prompted for the location they desire to visit/locate using the techniques described herein. In one embodiment, the location can be a street, city, alley, or GPS coordinates. Once a location is determined, either via the user's configuration or from the prompt provided to the user, the system locates the point cloud data of the location from the database as represented at 612. At 614 the point cloud data of the desired location is transmitted to the user. In one embodiment, the point cloud data is only transmitted to the client machine if the client machine informs the server that the data is not available on the client machine (e.g., the cache (memory) or storage device of the client machine). This can be performed to reduce network/bandwidth usage as the point cloud data can be of massive file size. In one embodiment, point cloud data files of the requested location are downloaded and stored in the user's computer. In another embodiment, a point cloud data file can be of various sizes depending on the detail and/or resolution of the interior/exterior settings involved, and also depending on the radius (distance) covered by each point cloud data file. In yet another embodiment, the point cloud data files are provided to the user separately (that is, before the user logs into the system to explore their surroundings). This can be done both offline (e.g., via a compact disk) and/or online (e.g., downloaded from a website, but before the user logs in to explore a certain location).

In one embodiment, the user's machine can inform the server if the point cloud data of a particular location is not available by the client machine. In yet another embodiment, the server can determine if the point cloud data has not already been transmitted to the client machine. If the point cloud data was transferred in a previous session, then the server can query the client (user) machine if the point cloud data is already available with the client machine, and if not, the server can retransmit the data again. At 616 the server transmits real time events while they occur in the location the user is exploring. This can include actions and locations of other users, special offers determined by an owner of a setting (business), mobile truck vendor, or any event which can potentially affect the experience of the point cloud data. At 618, the system determines the user's location within the point cloud data. This location can be transmitted directly from the user periodically to the server (using a push transmission to the server, a pull request from the server, or a combination thereof). At 620, the server can determine whether to update the user's point cloud data, and if so, control is passed back to 612 where the system locates new point cloud data based on the user's location. However if it is determined that no update of the user's point cloud data is needed then control is passed to 616 where the server continues to transmit real time events within the user's point cloud data. This process continues until the user logs out of the virtual world represented by the 3D geospatial coordinated point cloud data.

Figure 7:
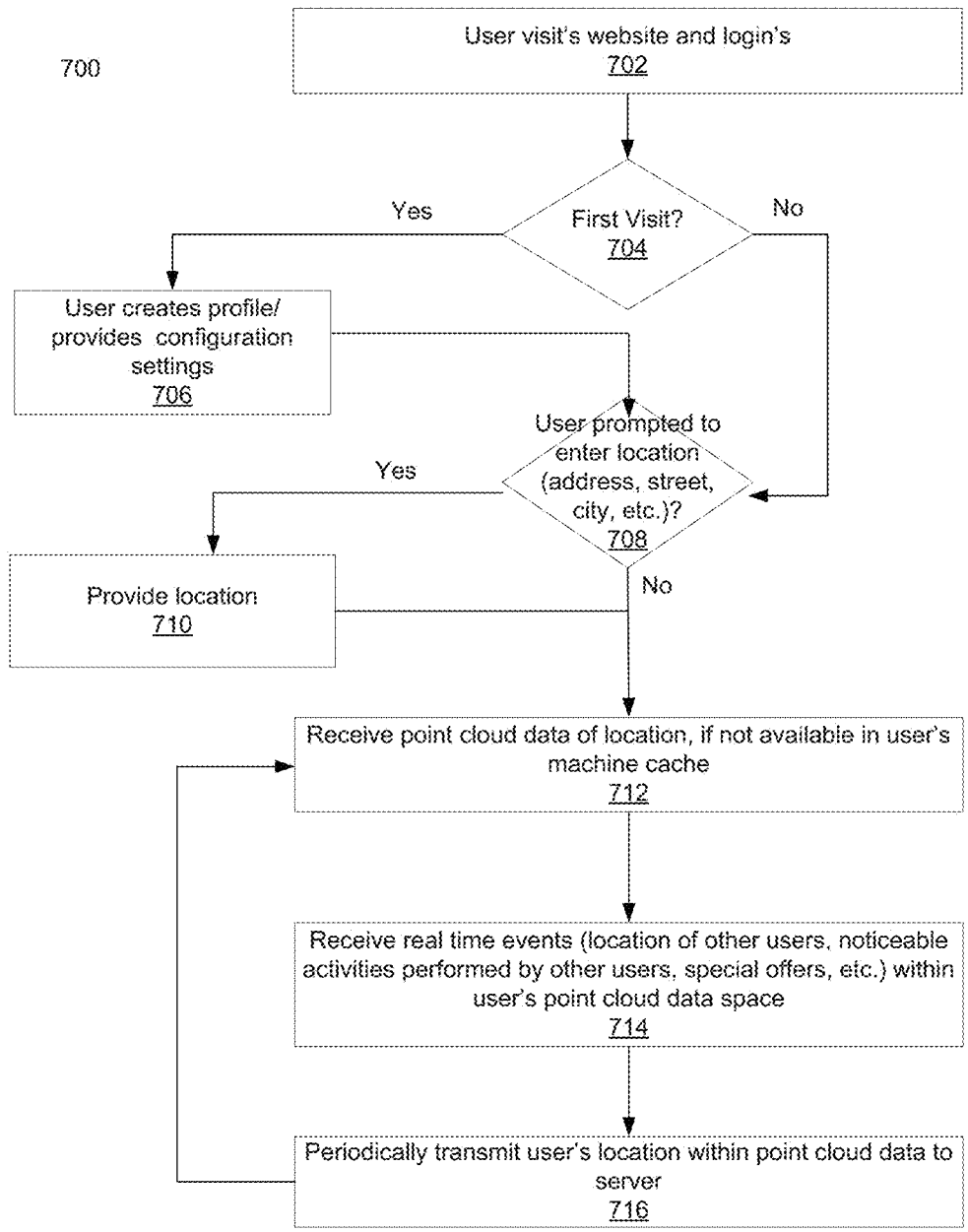
FIG. 7 represents a flowchart of a client machine that can communicate with the server described herein according to one embodiment of the present invention.

FIG. 7 represents a flowchart of a client machine that can communicate with the server described herein according to one embodiment of the present invention. At 702 the user visits the website and logs in. At 704 it is determined if it is the first time the user has visited the server (e.g., website). If it's the user's first visit then, at 706, the user is prompted to create an online persona to provide a profile and configuration information. At 708 it is determined if the user provided a home location while providing the configuration information to the server. If however the user did not provide a home/preferred/default location then, at 710, the user is prompted for a location the user wishes to explore. At 712, the point cloud data location is transmitted to the user, if not already done so previously. At 714 the client machine receives real time events from the server. Such events can be, for example, events pertaining to a location of other users noticeable activities, special offers, mobile vendors, etc. At 716 the user periodically transmits the user's location within the point cloud data to the server thereafter control passes on 712 where the user receives point cloud data location if not already available to the client machine. This process continues until the user exits the system.

Figure 8A:
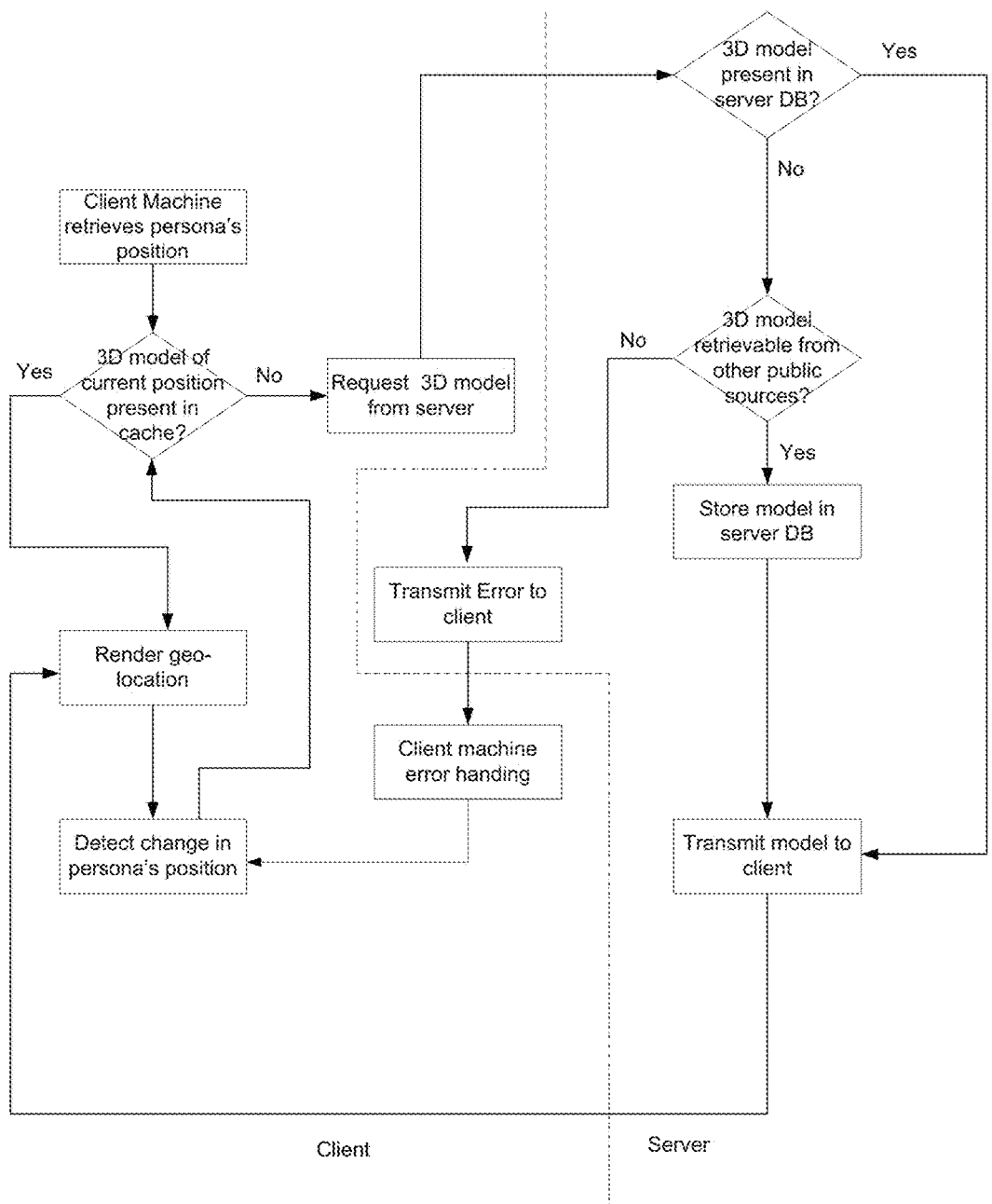
FIG. 8A illustrates a flowchart showing the interactions between the client and server when the three-dimensional geo-spatial model needs to be displayed to the user, according to one embodiment of the present invention.

FIG. 8A illustrates a flowchart 800 showing the interactions between the client and server when the three-dimensional geospatial model needs to be displayed to the user, according to one embodiment of the present invention. At 802 the client machine determines the persona's current position in the geospatial data setting. At 804 the client machine determines if the 3D geospatial data model/setting of persona's current position is present in cache. If so, at 806 the geospatial data is rendered and displayed at the client machine. In one embodiment, the geospatial data is transmitted efficiently as discussed in FIG. 2B. At 808 the client machine detects a change in the persona's position (e.g., coordinates) and control passes back to 804 where it is determined if the 3D model is present in the client computer's cache. If it is determined that the 3D model is not present in the client machine's cache a request is transmitted to the server to retrieve the 3D model data, as shown at 810. The server, at 812 determines if the 3D model requested by the client machine is present in its local database, and if so, the model is transmitted to the client, as illustrated by 818. If the 3D model is not present in the server's database, the server determines if the model is available/retrievable from a publicly available source, at 814. If so, at 816 the model is stored to the server database and transmitted to the client at 818 as discussed herein. It should be noted that the publicly available data setting need not be completely retrieved (for the complete setting) by the server before transmitting to the client. In one embodiment, if the data is retrieved from a publicly available source (that is, the data is not found on the server's database) only for an area within the persona's immediate vicinity (referred to as 234 in FIG. 2B) is processed and/or transmitted to the client machine initially. The server can concurrently retrieve other information about a setting as needed, and transmit it to the client machine after it has been processed by the server. In another embodiment, the server retrieves and transmits a low resolution model to the client machine initially (e.g., a low resolution model represented by 236 of FIG. 2B), according to the LOD tag associated to such model and persona position, while concurrently process the publicly available data into higher resolution setting (e.g., higher resolution model represented by 234 of FIG. 2B) that is eventually transmitted to the client after processing.

If however, at 814, the server determines that the data requested in unavailable, an error is transmitted to the client at 820. At 822, client machine's error configuration handles the error and control is transmitted to 808 where a change in the persona's position is detected. In one embodiment, the client machine's error handling configuration can include displaying an error to the client machine. In another embodiment, the error handling can include displaying a generic setting to the user in response of receiving the error message.

Figure 8B:
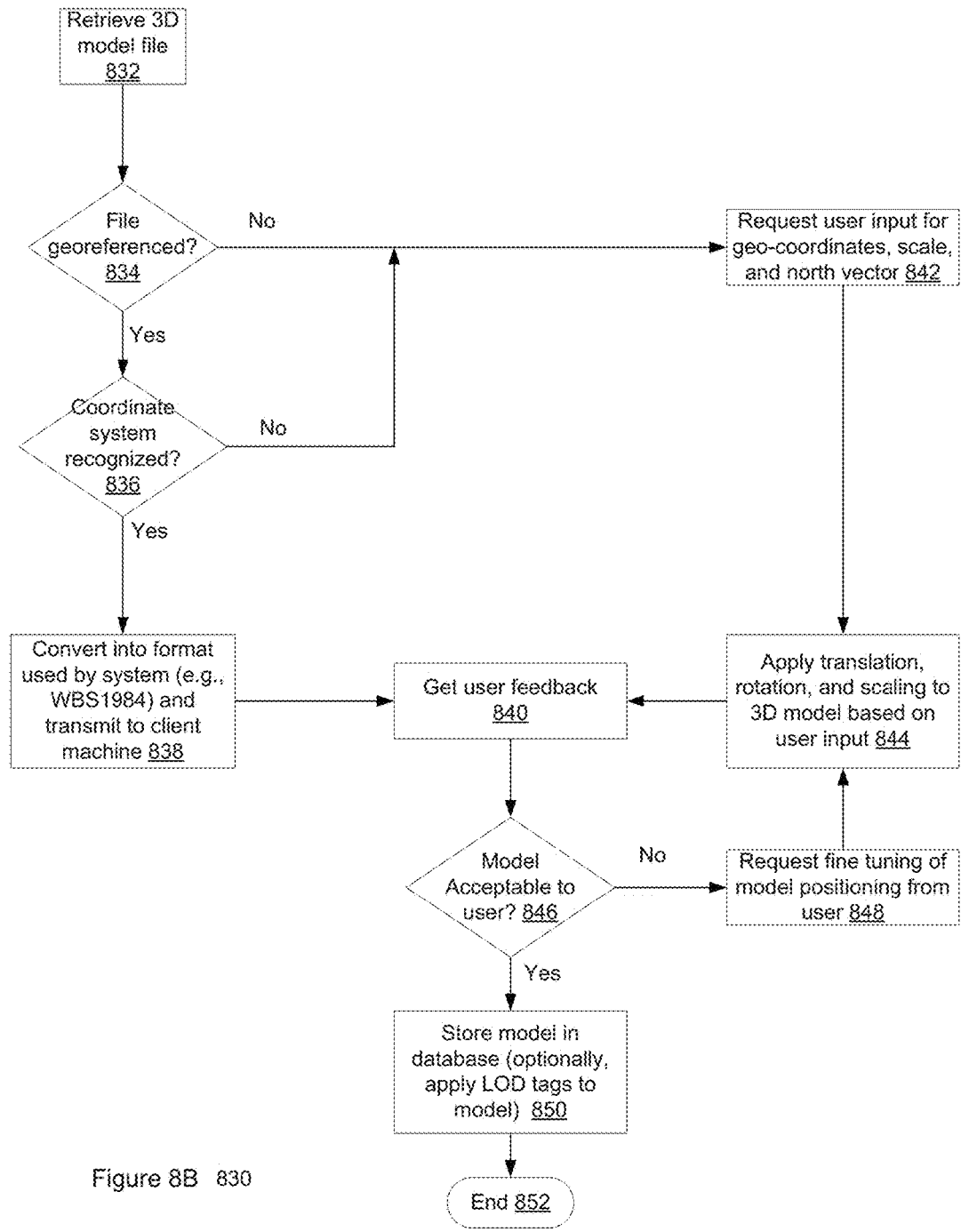
FIG. 8B illustrates a flowchart showing the server retrieving and storing the three-dimensional geo-spatial data from other sources, according to one embodiment of the present invention.

FIG. 8B illustrates a flowchart 830 showing the server retrieving and storing the three-dimensional geo-spatial data from other sources, according to one embodiment of the present invention. At 832 a 3D geospatial model/setting file is retrieved by the server. The file can be uploaded by a user or can be retrieved from a publicly available source. At 834, the server determines if the file is geo-referenced. As known to a person of ordinary skill in the art, georeferencing means associating the 3D geospatial data with locations in physical space (e.g., by providing GPS coordinates). If so, at 836 the coordinate system of the file is recognized. At 838, the file is converted into a format that the system uses. In one embodiment, the server uses WBS1984 format and all recognized georeferenced files are converted into this format before transmitting it to the client machine. At 840 the user's feedback is requested. At 846, it is determined, based on the user's feedback, whether the model is acceptable and if so, the model is stored in the database, at 850 and the process terminates at 852. Optionally, in an alternative embodiment, LOD tags/values are applied at 850, prior to terminating the process at 852.

In an alternative embodiment the model is stored comprising a COLLADA file structure that natively supports custom variable assignments to objects. Before storing the model at 850, the server automatically assigns a custom value called LOD tag to each object contained in the model file based on specific rules provided by the system administrator. Thus, in such an embodiment, the server can detect LOD tags already present in the model file (e.g. BIM models). As known to a person of ordinary skill in the art, BIM families are group of objects comprised in a BIM model having common parameters and functions (e.g. door family, wall family, etc.). In one embodiment, the server assigns LOD tags according to a relation table. The relation table relates each BIM family to a specific LOD tag. As a result, the system can prioritize the level of detail of each family. In an exemplary embodiment, BIM models can be assigned the following LOD tags

| BIM family type | Assigned LOD |
| --- | --- |
| doors family | LOD3 |
| Walls family | LOD1 |
| Windows family | LOD1 |
| Furniture family | LOD2 |

If the model is not acceptable to the user, at 848 the user is requested to provide fine tuned information and control is again transferred to as referenced by 844. If however, the file is not georeferenced, the user is asked to provide data using which the file can be georeferenced by the server, at 842. In one embodiment, this includes requesting user input for the geo-coordinates, scale and/or north vector. At 844, the server applies translation(s), rotation(s), and/or scales the 3D model using the input provided at 842. The server then requests the user's feedback as discussed in reference to 840 and continues from there. In one embodiment, the server assigns LOD tags based on CAD model layers. In yet another embodiment, the server prompts the user to manually assign LOD tags. Once the tags are assigned, the system can render the models as discussed at FIG. 2b.

Figure 8C:
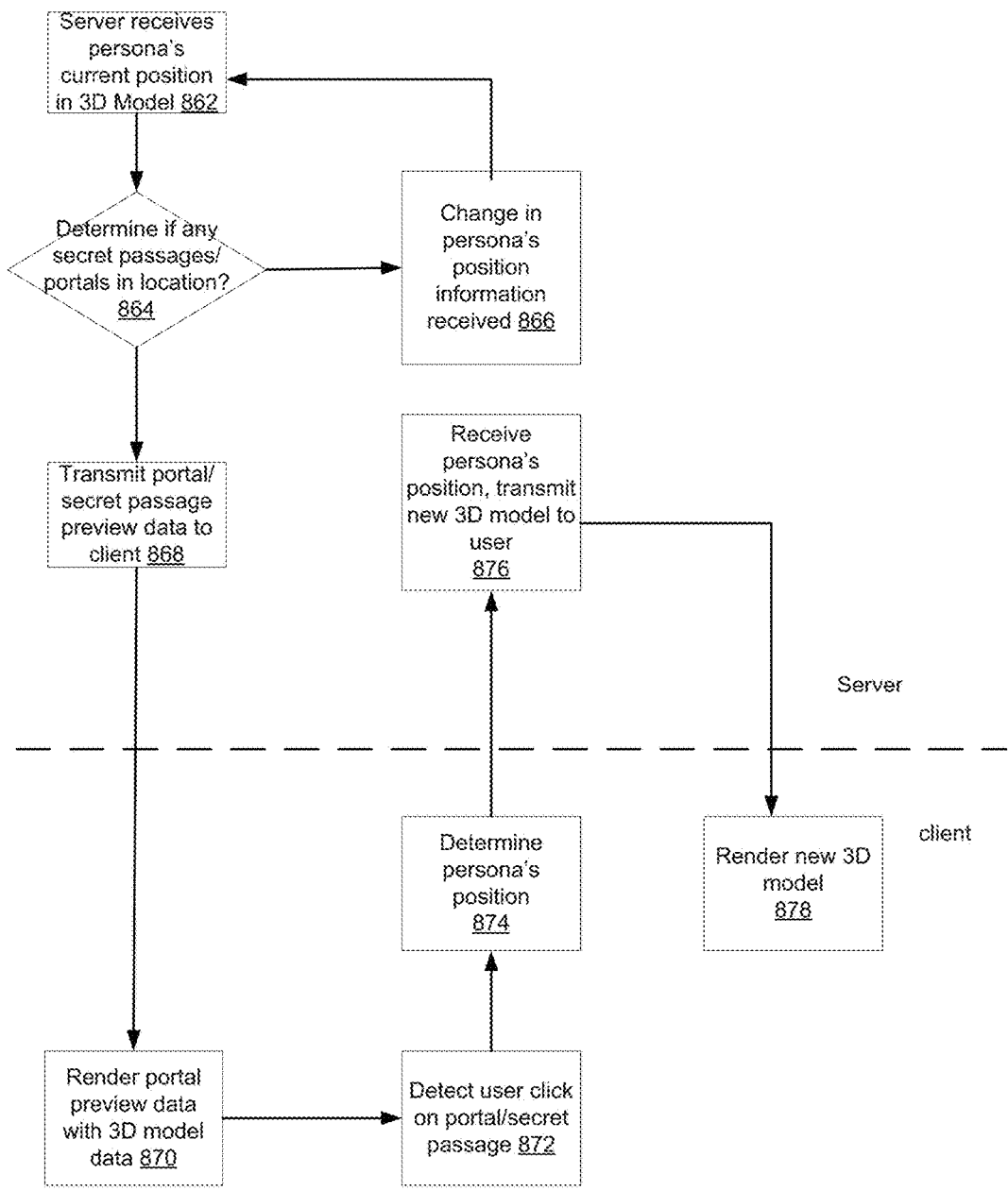
FIG. 8C illustrates a flowchart showing the client-server interactions to display secret passages or portals to the user, according to one embodiment of the present invention.

FIG. 8C illustrates a flowchart 860 showing the client-server interactions to display secret passages or portals to the user, according to one embodiment of the present invention. As illustrated, at 862 the server receives the persona's current position (GPS coordinates) in the 3D geospatial setting. At 864, it is determined if any secret passages/portals are within the persona's immediate surrounding. In one embodiment, the area searched for secret passages/portals is the area referenced as 234 in FIG. 2B. At 868, the server transmits the secret passage/portals preview data to the client machine, at 870, the client machine renders the secret passage/portal preview data within the 3D geospatial model. In one embodiment, the secret passage/portal preview data is shown on a geospatial object (e.g., wall), when the persona comes within close proximity of the geospatial object. At 872, it is determined if the user/persona clicked on a secret passage/portal, the persona's current virtual position/coordinates are determined and transmitted to the server, at 874. At 876, the virtual position of the persona is used to determine a new 3D geospatial setting/model, which is subsequently transmitted to the user's machine. At 878, the client receives the new 3D model and renders/displays it to the user. The new 3D model displayed to the user is a setting that is different from the persona's current setting (that is based on the persona's current geo-position/location). In one embodiment, the secret passage/portal acts as a teleportation travel and takes the persona to a different geospatial setting as soon as the user/persona clicks on the secret passage/portal preview data. Thus, for example, a secret passage/portal preview data representing the Eiffel Tower, Paris. France can be displayed on a wall of a building in San Francisco, Calif. As soon as the user/persona clicks on the secret passage/portal preview data representing of the Eiffel Tower, the user experiences teleportation style travel, in one embodiment, and the 3D model of the geospatial setting of (and around) the Eiffel Tower is rendered and displayed to the user. In another embodiment, the user/persona is given an option to "return" back to where the portal/secret passage originated (e.g., back to the building in San Francisco, Calif.). Thus, different embodiments can use different features to enhance the user's experience, as discussed herein.

Figure 9A:
FIG. 9A illustrates "mapalytics heat-maps" or map analytics according to an embodiment of the present invention.

FIG. 9A illustrates "mapalytics" heat-maps or map analytics according to an embodiment of the present invention. As shown, the mapalytics scores can be provided to the user a score feedback of the location being explored by the user. Mapalytics heat-maps provides a function within the system that leverages on public accessible database (such as GIS, Google maps, etc.) in order to gather georeferenced data, process them, and return the render of a synthetic map overlying the 3D scene. For instance, the concentration of a certain service can be easily shown through a heat-map where higher points represents higher concentration. For example, in one embodiment, 902 can represent the pedestrian accessibility score of the location being explored. 904 can represent the score for bicyclists. 906 can represent the driving score. 908 can represent the school score, based on the school district, and 910 can represent the nightlife score of the location. In one embodiment, the mapalytics heat score maps can be layer based, thus, the user can choose to see the scores only pertaining to their interests. In this way, the user can switch on or off multiple layers embedded into the geospatial data where the embedded layers may or may not be customized for a particular user. In one embodiment, the user can use a combination of techniques described herein to use the system as a route planner (e.g., traversing from point A to point B). In another embodiment, certain features may be presented to the user by the system itself. For example, if a street is blocked for an art festival, the walk/driving/bicycle, etc., score can automatically be updated and provided to the user. In this way, users can also be advised to refrain from visiting a particular location, if the art festival were to be in between the traversed route from point A to point B. In another embodiment, camera layers can also be provided to the user giving the user an opportunity to click on a webcam to view the art festival in real time. Without limitation, other scores (and layers) can be provided to represent electric vehicle rating, shopping rating, census information, views ratings, green-space rating, gradient (topological slope) rating, average rent rating, restaurant rating, public transit rating, or a combination (aggregate) of any of the above, etc. In one embodiment, the score ratings are retrieved from an external source. In another embodiment, the scores can be automatically provided based on the user's visiting history. For example, if a user only visits locations related to shopping activities (e.g., a mall), shopping scores can automatically be provided.

In one embodiment, determining the score for the heat-map can be represented by the parametric function for surface S. Surface S, at generic point J, can be represented as $S_J$: ($SU_J$, $SV_J$, $SW_J$), and defined as:

$$SU_J = Px_J$$
$$SV_J = Py_J$$
$$SW_J = \sum_i \left( \left( \frac{1}{d_{i,J}} \right)^2 \times \kappa \right)$$

Where $d_{i,J}$ is the distance between the J-th point of the parametric surface from the i-th point of interest. $d_{i,J}$ is defined as:

$$d_{i,J} = \sqrt{(Px_J - lx_i)^2 + (Py_J - ly_i)^2}$$

Where ($lx_i$, $ly_i$) represents the coordinates of the $i^{th}$ point of interest (e.g., hotels, restaurants, etc.). l represents the list of point of interests, $Px_J$, $Py_J$ representing the latitude and longitude of a generic point ($P_J$).

Figure 9B:
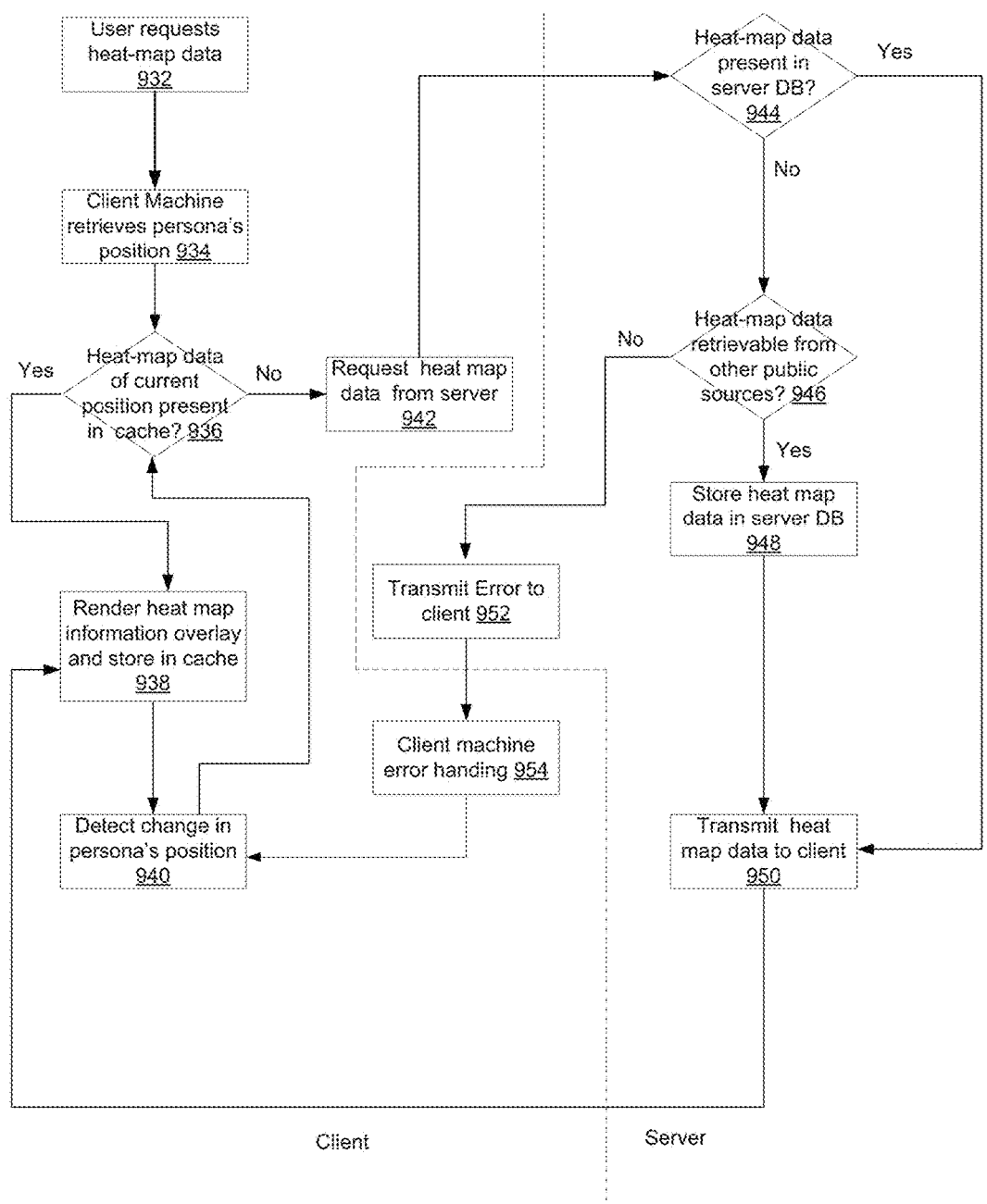
FIG. 9B illustrates a flowchart showing the client-server interactions to display heat-map data to the user, according to one embodiment of the present invention.

FIG. 9B illustrates a flowchart 930 showing the client-server interactions to display heat-map data to the user, according to one embodiment of the present invention. As illustrated, at 932 the user requests the heat-map data (mapalytics data) of a particular interest (e.g., the pedestrian accessibility) from the client machine. At 934 the client machine determines the persona's current geo-location to the server. At 936, it is determined if the locations heat-map data is present in the client machine's local cache. If so, at 938 the heat-map data is rendered and displayed at the client machine. In one embodiment, the heat-map data is transmitted efficiently as discussed in FIG. 2B. At 940 the client machine detects a change in the persona's position (e.g., geo-coordinates) and control passes back to 936 where it is determined if the heat-map data is present in the client computer's cache. If it is determined that the heat-map data is not present in the client machine's cache a request is transmitted to the server to retrieve the heat-map data, as shown at 942. The server, at 944 determines if the heat-map data requested by the client machine is present in its local database, and if so, the data is transmitted to the client, as illustrated by 950. If the heat-map data is not present in the server's database, the server determines if the data is available/retrievable from a publicly available source, at 946. If so, at 948 the data is stored to the server database and transmitted to the client at 950 as discussed herein. It should be noted that the publicly available heat-map data need not be completely retrieved (for the complete setting) by the server before transmitting to the client. In one embodiment, if the data is retrieved from a publicly available source (that is, the data is not found on the server's database) only for an area within the persona's immediate vicinity (referred to as 234 in FIG. 2B) is processed and/or transmitted to the client machine initially. The server can concurrently retrieve other information about the setting as needed, and transmit it to the client machine after it has been processed by the server. If however, at 946, the server determines that the data requested in unavailable, an error is transmitted to the client at 952. At 954 client machine's error configuration handles the error and control is transmitted to 940 where a change in the persona's position is detected. In one embodiment, the client machine's error handling configuration can include displaying an error to the user. In another embodiment, the error handling can include displaying generic information about the heat-map to the user in response to receiving the error message.

FIG. 9C illustrates an interface in which the user can be provided the ability to save favorite locations, landmarks, notes, see locations of friends, and share data, and optionally view this data in form of layers on top of the rendered point cloud data maps/models, according to an embodiment of the invention. For example, if the user of persona 202 visits kitchen artisia and explores model 402, the user can create notes and share the information with friends, or with other users. The user of persona 402 can, in one embodiment, also ask for advice from other users or from experts in the field of interior design. In another embodiment the user may also be able to see the frequency at which they visited the particular location. In another embodiment the user may also be able to view the location of their friends or the places they visit, if such information is shared by other users. Information may be stored and presented as meta-data tags associated with the 3D geospatial mappings. In another embodiment, the user can be provided the ability to turn on/off layers of the favorite locations, landmarks, notes, friends, etc. For example, in FIG. 2A, the user of persona 206 can turn on (or off) the layer to see their friends out of personas 202, 204, and 208. In one embodiment, this can be done by displaying a pin (or bubble) over the respective personas indicating a friend. Similarly, if user of persona 202 indicates kitchen artisia as a landmark or favorite, when the user turns on the landmark (or favorites) layer, a marker can be placed on kitchen artisia indicating the user's landmark or favorite. In a similar manner notes can also be displayed. In one embodiment, a user can also be provided optional layers to see information shared by their friends.

Particular embodiments may be implemented in a network environment, network environment includes a network coupling one or more servers and one or more clients to each other. In particular embodiments, network is an intranet, an extranet, a virtual private network (VPN), a local area network (LAN), a wireless LAN (WLAN), a wide area network (WAN), a metropolitan area network (MAN), a portion of the Internet, or another network or a combination of two or more such networks. This disclosure contemplates any suitable network.

One or more links couple a server or a client to a network. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. This disclosure contemplates any suitable links coupling servers and clients to network.

In particular embodiments, each server may be a unitary server or may be a distributed server spanning multiple computers or multiple datacenters. Servers may be of various types, such as, for example and without limitation, web server, news server, mail server, message server, advertising server, file server, application server, exchange server, database server, or proxy server. In particular embodiments, each server may include hardware, software, or embedded logic components or a combination of two or more such components for carrying out the appropriate functionalities implemented or supported by server. For example, a web server is generally capable of hosting websites containing web pages or particular elements of web pages. More specifically, a web server may host HTML files or other file types, or may dynamically create or constitute files upon a request, and communicate them to clients in response to HTTP or other requests from clients. A mail server is generally capable of providing electronic mail services to various clients. A database server is generally capable of providing an interface for managing data stored in one or more data stores. In particular embodiments, a 3D geospatial data visualization system may be hosted on a server (e.g., as a geospatial data visualization website). Its users may access the geospatial visualization system using their client devices (e.g. clients).

In particular embodiments, one or more data storages may be communicatively linked to one or more severs via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

In particular embodiments, each client may be an electronic device including hardware, software, or embedded logic components or a combination of two or more such components and capable of carrying out the appropriate functionalities implemented or supported by client. For example and without limitation, a client may be a desktop computer system, a notebook computer system, a netbook computer system, a handheld electronic device, or a mobile telephone. This disclosure contemplates any suitable clients. A client may enable a network user at client to access network. A client may enable its user to communicate with other users at other clients.

A client may have a web browser, such as MICROSOFT INTERNET EXPLORER, GOOGLE CHROME or MOZILLA FIREFOX, and may have one or more add-ons, plug-ins, or other extensions, such as TOOLBAR. A user at client may enter a Uniform Resource Locator (URL) or other address directing the web browser to a server, and the web browser may generate a Hyper Text Transfer Protocol (HTTP) request and communicate the HTTP request to server. Server may accept the HTTP request and communicate to client one or more Hyper Text Markup Language (HTML) files responsive to the HTTP request. Client may render a web page based on the HTML files from server for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT. JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate. In certain embodiments, the client machine can access the server using a mobile application, web application, and/or a software application that can be downloaded on to the client machine.

The techniques shown in the figures can be implemented using computer program instructions (computer code) and data stored and executed on one or more electronic systems (e.g., computer systems, etc.). Such electronic systems store and communicate (internally and/or with other electronic systems over a network) code and data using machine-readable media, such as machine-readable non-transitory storage media (e.g., magnetic disks; optical disks; random access memory; dynamic random access memory; read only memory; flash memory devices; phase-change memory). In addition, such electronic systems typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device.

It should be apparent from this description that aspects of the present invention may be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize that what is meant by such ions is that the functions result from execution of the code by a processor.

Figure 10:
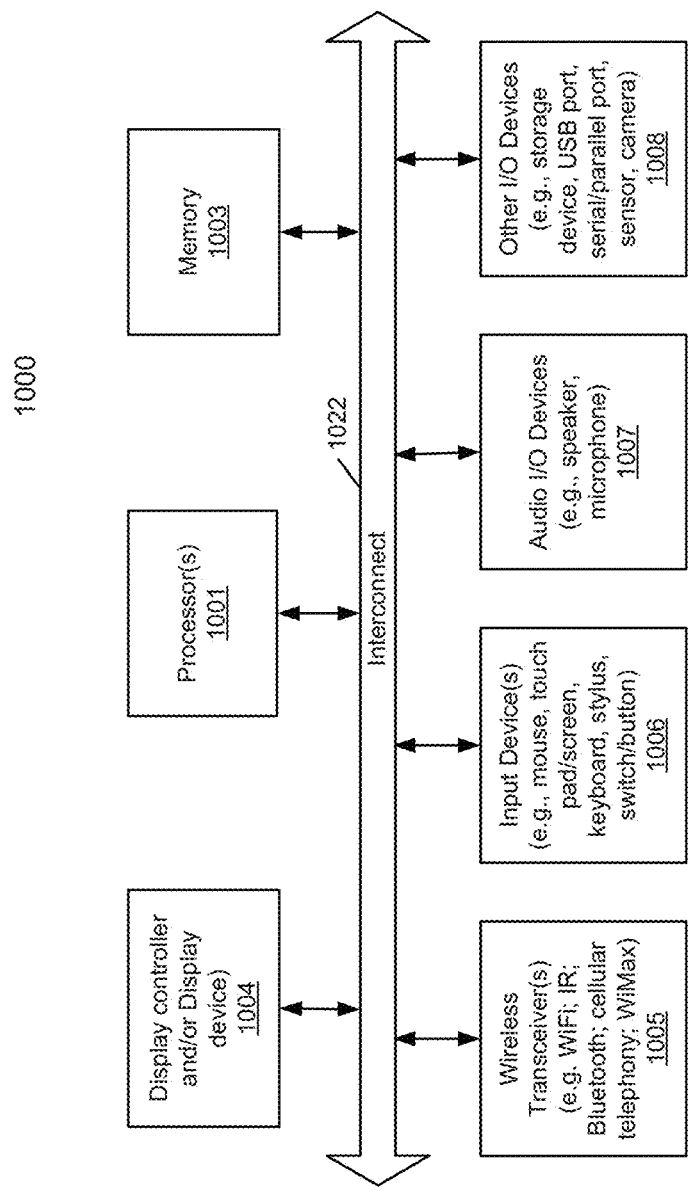
FIG. 10 illustrates a block diagram illustrating a data processing system which can be used as a computing device with any embodiment of the invention.

FIG. 10 is a block diagram illustrating a data processing system such as a computing system 1000 which may be used with one embodiment of the invention. For example, system 1000 may be implemented as part of a three-dimensional geospatial visualization system as described in various embodiments herein. In one embodiment, system 1000 may represent the server or client machines, described herein. System 1000 may have a distributed architecture having dispersed units coupled through a network, or all of its components may be integrated into a single unit.

For example, computing system 1000 may represent any of data processing systems described above performing any of the processes or methods described above. System 1000 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1000 is intended to show a high level view of many components of the computer system. However, it is to be understood that additional or fewer components may be present in certain implementations and furthermore, different arrangement of the components shown may occur in other implementations. System 1000 may represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 1000 includes processor 1001, memory 1003, and devices 1005-1008 via a bus or an interconnect 1022. Processor 1001 may represent a single processor or multiple processors with a single processor core or multiple processor cores included therein. Processor 1001 may represent one or more general-purpose processors such as a microprocessor, a central processing unit (CPU), or the like. More particularly, processor 1001 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1001 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1001, which may be a low power multi-core processor socket such as an ultra low voltage processor, may act as a main processing unit and central hub for communication with the various components of the system. Such processor can be implemented as a system on chip (SoC). In one embodiment, processor 1001 may be an Intel® Architecture Core™-based processor such as an i3, i5, i10 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments.

Processor 1001 is configured to execute instructions for performing the operations and methods discussed herein. System 1000 further includes a graphics interface that communicates with graphics subsystem 1004, which may include a display controller and/or a display device.

Processor 1001 may communicate with memory 1003, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 2010-2E (published April 20010), or a next generation LPDDR standard to be referred to as LPDDR3 that will offer extensions to LPDDR2 to increase bandwidth. As examples, 2/4/8 gigabytes (GB) of system memory may be present and can be coupled to processor 810 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 1003 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 1003 may store information including sequences of executable program instructions that are executed by processor 1001, or any other device. For example, executable code and/or data of a variety of operating systems, device drivers, firmware (e.g., input output basic system or BIOS), and/or applications can be loaded in memory 1003 and executed by processor 1001. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1000 may further include IO devices such as devices 1005-1008, including wireless transceiver(s) 1005, input device(s) 1006, audio IO device(s) 10010, and other IO devices 1008. Wireless transceiver 1005 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof.

Input device(s) 1006 may include a mouse, a touch pad, a touch sensitive screen (which may be integrated with display device 1004), a pointer device such as a stylus, and/or a keyboard (e.g., physical keyboard or a virtual keyboard displayed as part of a touch sensitive screen). For example, input device 1006 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO device 10010 may include a speaker and/or a microphone to facilitate voice-enabled functions, such as voice recognition, voice replication, digital recording, and/or telephony functions. Other optional devices 1008 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 1008 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1010 via a sensor hub (not shown), while other devices such as a keyboard or thermal sensor may be controlled by an embedded controller (not shown), dependent upon the specific configuration or design of system 1000.

To provide for persistent storage of information such as data, applications, one or more operating systems and so forth, a mass storage (not shown) may also couple to processor 1001. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 1001, e.g., via a serial peripheral interface (SPI). This flash device may provide for non-volatile storage of system software, including basic input/output software (BIOS) as well as other firmware of the system.

Note that while system 1000 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Thus, methods, apparatuses, and computer readable medium are described to implement a three-dimensional geospatial visualization system. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A non-transitory computer readable medium comprising instructions which when executed by a processing system of a computing device performs a method to display a three-dimensional rendering of geospatial data on a computing device, the method comprising:
    requesting, by the computing device, global positioning system (GPS) coordinated three-dimensional (3D) point cloud data related to a geographical location, wherein the point cloud data provides a realistic representation of the geographical location;
    receiving the point cloud data from a server, and wherein the server transmits the point cloud data after receiving information related to GPS coordinates of the geographical location;
    rendering the point cloud data to depict a 3D view of the geographical location, wherein a plurality of objects within the point cloud data are rendered at different level of details, and wherein each object from the plurality of objects is assigned a value based on its virtual distance from a persona, the plurality of objects forming at least a portion of the 3D view of the geographical location, and wherein each object is rendered based on its value;
    receiving information about real-time events related to the geographical location, the real-time information transmitted from a database associated with the server; and
    displaying the real-time events on the rendered point cloud data, wherein the persona can navigate through interior and exterior settings included in the rendered point cloud data.

2. The non-transitory computer readable medium of claim 1, wherein the interior settings can be locked and unlocked by means of an electronic code to prevent access and view by unauthorized persona, but allow access by an authorized persona.

3. The non-transitory computer readable medium of claim 2, wherein the interior settings display items that are displayed at the geographical location.

4. The non-transitory computer readable medium of claim 1, wherein the point cloud data is requested responsive to determining the GPS coordinates of the geographical location where the persona is positioned within the rendered point cloud data, the persona representing a user in a virtual world.

5. The non-transitory computer readable medium of claim 4, wherein the computing device periodically determines the position of the persona in the rendered point cloud data, and wherein the computing device, prior to requesting the point cloud data from the server, determines that the point cloud data is not available locally in its cache.

6. The non-transitory computer readable medium of claim 4, wherein movement of the persona in the rendered point cloud data can be set to various speeds representing at least one of a pedestrian speed, bicycle speed, automobile speed, airplane speed, or air-balloon speed.

7. The non-transitory computer readable medium of claim 1, wherein real-time events are displayed to a user using video cameras present at the geographical location.

8. A method to display a three-dimensional rendering of geospatial data, the method comprising:
    receiving, by a server, a request to transmit global positioning system (GPS) coordinated three-dimensional (3D) point cloud data related to a geographical location, wherein the point cloud data provides a realistic representation of the geographical location;

transmitting, to a computing device, the point cloud data from the server, and wherein the server transmits the point cloud data after receiving information related to GPS coordinates of the geographical location;

transmitting information about real-time events related to the geographical location, the real-time information transmitted from a database associated with the server;

wherein the computing device renders the point cloud data to depict a 3D view of the geographical location, wherein a plurality of objects within the point cloud data are rendered at different level of details, and wherein each object from the plurality of objects is assigned a value based on its virtual distance from a persona, the plurality of objects forming at least a portion of the 3D view of the geographical location, and wherein each object is rendered based on its value, and wherein the computing device displays the real-time events on the rendered point cloud data and wherein the persona can navigate through interior and exterior settings included in the rendered point cloud data.

9. The method of claim 8, wherein the interior settings can be locked and unlocked by means of an electronic code to prevent access and view by unauthorized persona, but allow access by an authorized persona.

10. The method of claim 9, wherein the interior settings display items that are displayed at the geographical location.

11. The method of claim 8, wherein the point cloud data is requested by the computing device responsive to determining the GPS coordinates of the geographical location where the persona is positioned within the rendered point cloud data, the persona representing a user in a virtual world.

12. The method of claim 11, wherein the computing device periodically determines the position of the persona in the rendered point cloud data, and wherein the computing device, prior to requesting the point cloud data from the server, determines that the point cloud data is not available locally in its cache.

13. The method of claim 11, wherein movement of the persona in the rendered point cloud data can be set to various speeds representing at least one of a pedestrian speed, bicycle speed, automobile speed, airplane speed, or air-balloon speed.

14. The method of claim 8, wherein real-time events are displayed to a user using video cameras present at the geographical location.

15. A system to display a three-dimensional rendering of geospatial data comprising:

a client machine, wherein the client machine is configured to:

request global positioning system (GPS) coordinated three-dimensional (3D) point cloud data related to a geographical location, wherein the point cloud data provides a realistic representation of the geographical location, receive the point cloud data, render the point cloud data to depict a 3D view of the geographical location, wherein a plurality of objects within the point cloud data are rendered at different level of details, and wherein each object from the plurality of objects is assigned a value based on its virtual distance from a persona, the plurality of objects forming at least a portion of the 3D view of the geographical location, and wherein each object is rendered based on its value, receive information about real-time events related to the geographical location, and display the real-time events on the rendered point cloud data, wherein the persona can navigate through interior and exterior settings included in the rendered point cloud data; and a server, the server configured to:

receive a request by the client machine to transmit the GPS coordinated point cloud data related to the geographical location, transmit the point cloud data from to the client machine, wherein the server transmits the point cloud data after receiving information related to GPS coordinates of the geographical location, and transmit information about real-time events related to the geographical location, the real-time information transmitted from a database associated with the server.

16. The system of claim 15, wherein the interior settings can be locked and unlocked by means of an electronic code to prevent access and view by an unauthorized persona, but allow access by an authorized persona.

17. The system of claim 16, wherein the interior settings display items that are displayed at the geographical location.

18. The system of claim 15, wherein the point cloud data is requested by the client machine responsive to determining the GPS coordinates of the geographical location where the persona is positioned within the rendered point cloud data, the persona representing a user in a virtual world.

19. The system of claim 18, wherein the client machine periodically determines the position of the persona in the rendered point cloud data, and wherein the client machine, prior to requesting the point cloud data from the server, determines that the point cloud data is not available locally in its cache.

20. The system of claim 18, wherein movement of the persona in the rendered point cloud data can be set to various speeds representing at least one of a pedestrian speed, bicycle speed, automobile speed, airplane speed, or air-balloon speed, and wherein real-time events are displayed to a user using video cameras present at the geographical location.

* * * * *